United States Patent
Kato et al.

(10) Patent No.: US 7,415,518 B2
(45) Date of Patent: Aug. 19, 2008

(54) FILE SERVER PROGRAM

(75) Inventors: Yuji Kato, Aichi (JP); Kenji Tonami, Aichi (JP); Tomoaki Sato, Aichi (JP)

(73) Assignee: Fujitsu Limited, Kawasaki (JP)

( * ) Notice: Subject to any disclaimer, the term of this patent is extended or adjusted under 35 U.S.C. 154(b) by 742 days.

(21) Appl. No.: 10/295,920

(22) Filed: Nov. 18, 2002

(65) Prior Publication Data

US 2003/0097437 A1 May 22, 2003

(30) Foreign Application Priority Data

Nov. 21, 2001 (JP) ............................. 2001-356071

(51) Int. Cl.
*G06F 15/173* (2006.01)
(52) U.S. Cl. ...................... 709/225; 709/223
(58) Field of Classification Search .............. 709/230, 709/223, 225
See application file for complete search history.

(56) References Cited

U.S. PATENT DOCUMENTS

2001/0047400 A1* 11/2001 Coates et al. ............... 709/219
2002/0120763 A1* 8/2002 Miloushev et al. .......... 709/230

FOREIGN PATENT DOCUMENTS

JP 2000-207370 7/2000
JP 2001-51890 2/2001

OTHER PUBLICATIONS

Japanese Patent Abstract 05-233417, dated Sep. 10, 1993.
Sudo, "Cooperative caching algorithm for cluster distributed file servers", Media Technology Laboratory, Canon Inc., vol. 4, pp. 2607-2610, Jun. 1999.
Japanese Office Action for corresponding Japanese patent application No. 2001-356071 dated Nov. 21, 2006.

* cited by examiner

*Primary Examiner*—Jason Cardone
*Assistant Examiner*—Chirag R Patel
(74) *Attorney, Agent, or Firm*—Staas & Halsey LLP

(57) ABSTRACT

A file server program that performs proper load distribution among a plurality of file servers. One of the plurality of file servers judges whether to perform a process in compliance with a request to manipulate a file on the basis of judgment conditions predefined for judging which process of processes performed by a cluster it should take charge of when it receives the request to manipulate a file of requests to manipulate a file sent to the plurality of file servers included in the cluster. If it judges that it must perform a process in compliance with the request to manipulate a file, it performs a process on a storage device which it manages in compliance with the request to manipulate a file.

7 Claims, 24 Drawing Sheets

111 DIRECTORY

| FILE NAME | FILE ID |
|---|---|
| DIRECTORY NAME | FILE ID |
| FILE NAME | FILE ID |
| FILE NAME | FILE ID |
| DIRECTORY NAME | FILE ID |
| ⋮ | ⋮ |
| FILE NAME | FILE ID |
| DIRECTORY NAME | FILE ID |
| FILE NAME | FILE ID |

FIG. 6

FILE SERVER PROGRAM

BACKGROUND OF THE INVENTION (1) Field of the Invention

This invention relates to a file server program for manipulating a file in response to a request from another unit and, more particularly, to a file server program used on a computer included in a cluster.

(2) Description of the Related Art

Conventionally, file servers have been used to share a file among a plurality of computers. A client computer (hereinafter referred to simply as a client) using file servers can obtain a necessary file by accessing the file servers via networks.

By the way, file servers on large-scale networks manage a vast number of files. Moreover, there are a large number of clients which use files. Therefore, a cluster is formed by a plurality of file servers and processes related to file manipulation (such as writing or reading a file) are distributed among the plurality of file servers. This reduces the load on each file server.

If a large number of files are managed distributively in this way by a plurality of file servers, each client must always realize which file server manages each file.

One method for making a client realize a file server which manages a file is to store file management information for the entire system on one of a plurality of file servers. Under this method, each client can realize a file server which manages a file by inquiring of a file server which stores file management information.

Another method for making a client realize a file server which manages a file is to define a certain rule as to determination of a file server which creates a directory for storing a file. Under this method, a file server which manages a directory manages files under this directory. For example, Japanese Patent Laid-Open Publication No. Hei5-233417 discloses an example of this method. According to the invention disclosed in Japanese Patent Laid-Open Publication No. Hei5-233417, a file server which creates a directory is determined under a rule which uses the identifier of the directory. Under this rule, a client specifies a file server which created the directory.

Under the conventional methods, however, it has been difficult to properly distribute a load.

That is to say, under the method of storing file management information for the entire system on one file server, the processing load on the file server which stores the file management information will increase with an increase in the number of files accessed.

Under the method of determining a file server which manages a file on the basis of a directory identifier, a limited number of file servers will create directories if there are many similar directory identifiers. For example, if a file server is determined on the basis of the first letter in a directory identifier, the processing load on a file server which creates a directory of an identifier beginning with a letter frequently used will be heavier than the processing loads on the other file servers.

If a load is not distributed properly, a delay in a file manipulation process will occur. This degrades the throughput of the entire cluster.

Moreover, in recent years transmission speeds on networks have increased. As a result, file write and read rates on file servers are slow, compared with data transfer rates on networks. Therefore, it is greatly hoped that file write rates and file read rates on file servers will be improved.

SUMMARY OF THE INVENTION

The present invention was made under the background circumstances as described above. An object of the present invention is to provide a file server program which can perform proper load distribution among a plurality of file servers.

In order to achieve the above object, a file server program for making a computer function as one of a plurality of file servers included in a cluster is provided. This file server program makes the computer perform the steps of judging whether to perform a process in compliance with a request to manipulate a file on the basis of judgment conditions predefined for judging which process of processes performed by the cluster the computer should take charge of at the time of receiving the request to manipulate a file of requests to manipulate a file sent to the plurality of file servers included in the cluster and performing a process on a storage device which the computer manages in compliance with the request to manipulate a file in the case of judging that the computer must perform a process in compliance with the request to manipulate a file.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 is a view showing the structure of data in a directory.

DESCRIPTION OF THE PREFERRED EMBODIMENTS

Embodiments of the present invention will now be described with reference to the drawings.

An overview of the invention applied to embodiments of the present invention will be described first, then the concrete contents of the embodiments of the present invention will be described.

Figure 1:
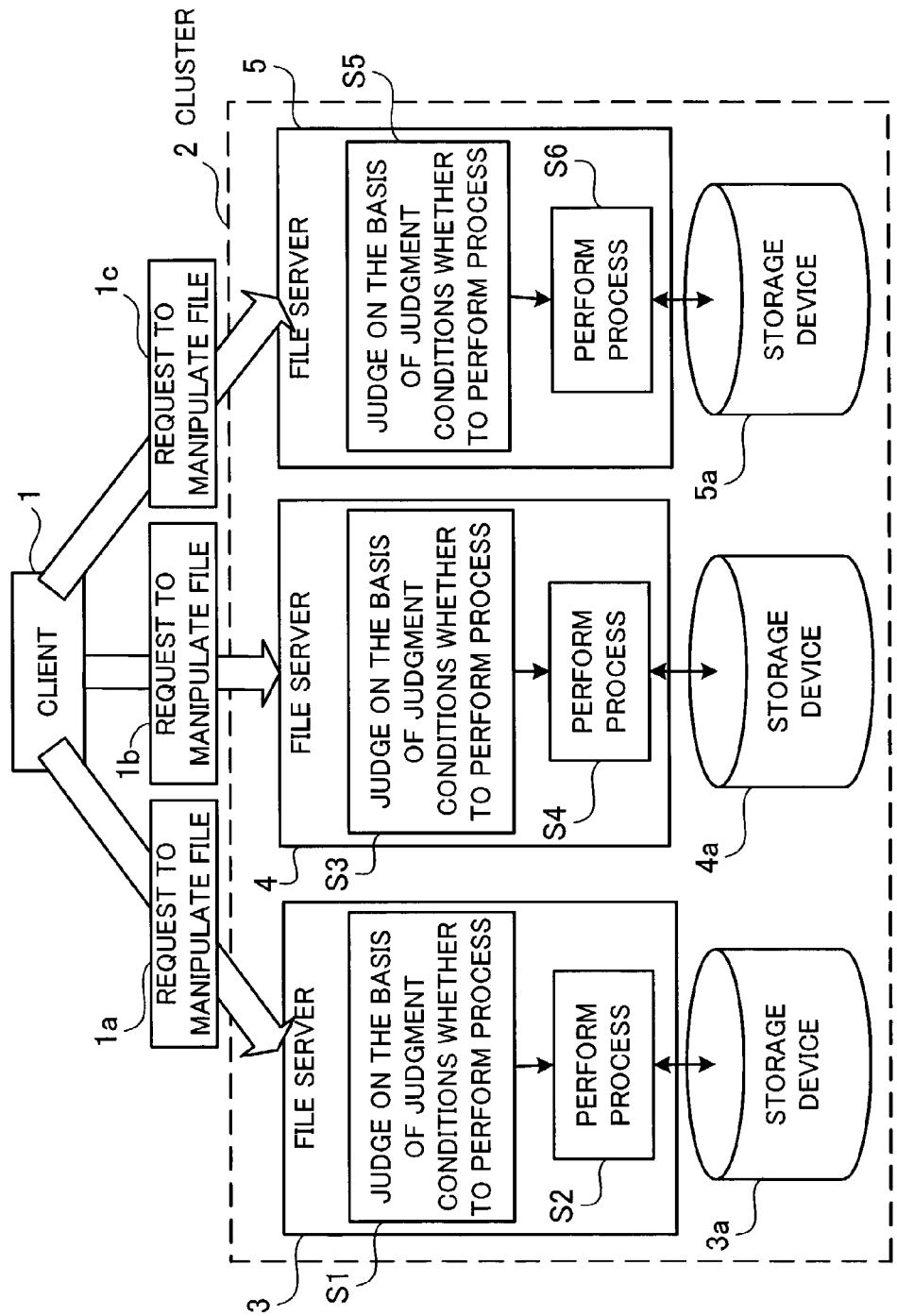
FIG. 1 is a schematic view of the invention applied to embodiments of the present invention.

FIG. 1 is a schematic view of the invention applied to embodiments of the present invention. A file server program according to the present invention can make a computer function as one of a plurality of file servers 3, 4, and 5 included in a cluster 2. The cluster 2 performs file manipulation (such as creating a directory, writing a file, or reading a file) in compliance with requests 1a, 1b, and 1c from a client 1 to manipulate a file.

Judgment conditions for judging which process of processes performed by the cluster 2 the computer (file server 3, 4, or 5) should take charge of are predefined on the computer on which a file server program according to the present invention is executed. When the file server 3, 4, and 5 receive the requests 1a, 1b, and 1c to manipulate a file, respectively, sent to the plurality of file servers 3, 4, and 5 included in the cluster 2, they judge on the basis of the judgment conditions whether to perform processes in compliance with the requests 1a, 1b, and 1c, respectively, to manipulate a file (steps S1, S3, and S5). If the file server 3 judges that it needs to perform a process in compliance with the request 1a to manipulate a file, then it performs a process in compliance with the request 1a to manipulate a file on a storage device 3a it manages (step S2). If the file server 4 judges that it needs to perform a process in compliance with the request 1b to manipulate a file, then it performs a process in compliance with the request 1b to manipulate a file on a storage device 4a it manages (step S4). If the file server 5 judges that it needs to perform a process in compliance with the request 1c to manipulate a file, then it performs a process in compliance with the request 1c to manipulate a file on a storage device 5a it manages (step S6).

By using such a file server program, the client 1 outputs the requests 1a, 1b, and 1c to manipulate a file to all the file servers 3, 4, and 5 and each file server which judges that it needs to perform a process will perform a process corresponding to one of the requests 1a, 1b, and 1c to manipulate a file.

As a result, the client 1 need only outputs the requests 1a, 1b, and 1c to manipulate a file to all the file servers 3, 4, and 5 when the client 1 requests the cluster 2 to manipulate a file. That is to say, the client 1 does not need to realize which of the file servers 3, 4, and 5 will perform each process. This makes a process for making the client 1 realize which file server will perform file manipulation unnecessary, resulting in an increase in the efficiency of a process.

Moreover, in the present invention a process (for making the client 1 realize which a file manipulation process is requested of) which has conventionally caused great inequalities of processing loads on file servers becomes unnecessary. As a result, these great inequalities of processing loads can be prevented. Therefore, proper load distribution will be performed and the processing speed of the entire cluster 2 will be improved.

Now, embodiments will be described in detail with a case where the present invention is applied to a file server system as an example.

First Embodiment

Figure 2:
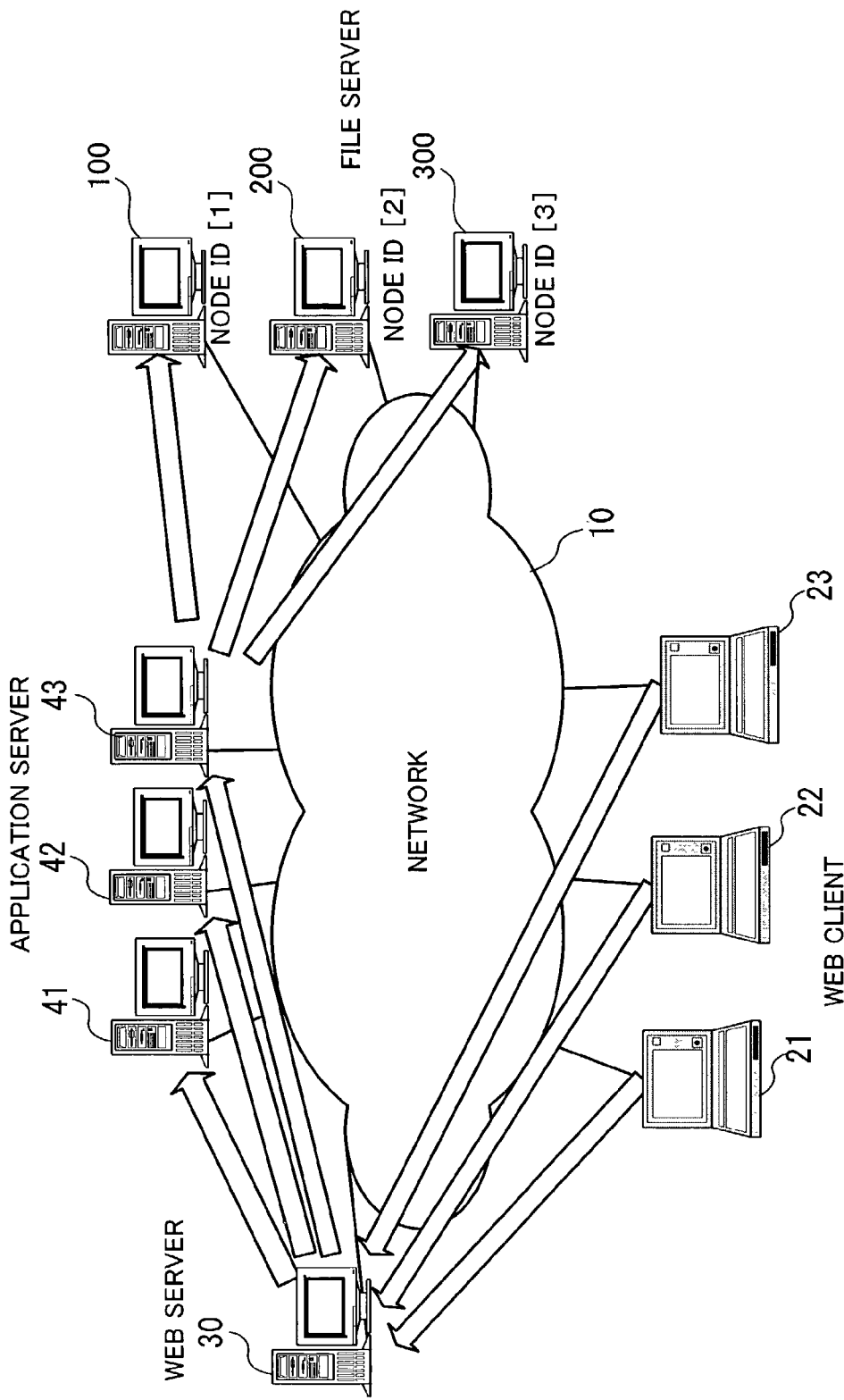
FIG. 2 is a view showing the structure of a system used in a first embodiment.

FIG. 2 is a view showing the structure of a system used in a first embodiment. In the first embodiment, a plurality of Web clients 21, 22, and 23, a Web server 30, application servers 41, 42, and 43, and a plurality of file servers 100, 200, and 300 are connected via a network 10.

Each of the Web clients 21, 22, and 23 has the function of browsing the World Wide Web (WWW), that is to say, stores a browser. The Web clients 21, 22, and 23 can access the Web server 30 to browse various contents.

The Web server 30 provides contents in response to requests from the Web clients 21, 22, and 23. Moreover, when the Web server 30 receives requests (write requests or read requests) from the Web clients 21, 22, and 23 to access a file stored on the file server 100, 200, or 300, the Web server 30 asks the application servers 41, 42, and 43 to handle these requests.

When the Web server 30 must perform a sophisticated process, the application server 41, 42, or 43 performs the process in place of the Web server 30. For example, the application servers 41, 42, and 43 inherit handling requests to the file servers 100, 200, and 300 to manipulate a file from the Web server 30. The application servers 41, 42, and 43 which inherited handling these requests output requests to manipulate a file to the file servers 100, 200, and 300. Then the application servers 41, 42, and 43 inform the Web server 30 of the results of the requests to the file servers 100, 200, and 300 to manipulate a file.

Each of the application servers 41, 42, and 43 functions as the client 1 shown in FIG. 1.

Each of the plurality of file servers 100, 200, and 300 has a large-scale storage device and the whole of the file servers 100, 200, and 300 forms a cluster. Environments in which the storage devices the file servers 100, 200, and 300 included in the cluster have are used are provided to the application servers 41, 42, and 43. For example, the file servers 100, 200, and 300 perform processes, such as creating a directory, writing a file, and reading a file, in compliance with requests from the application servers 41, 42, and 43 to manipulate a file.

A node ID is assigned to each of the file servers 100, 200, and 300 to uniquely identify it. In the example shown in FIG. 2, the node IDs of the file servers 100, 200, and 300 are [1], [2], and [3] respectively.

Figure 3:
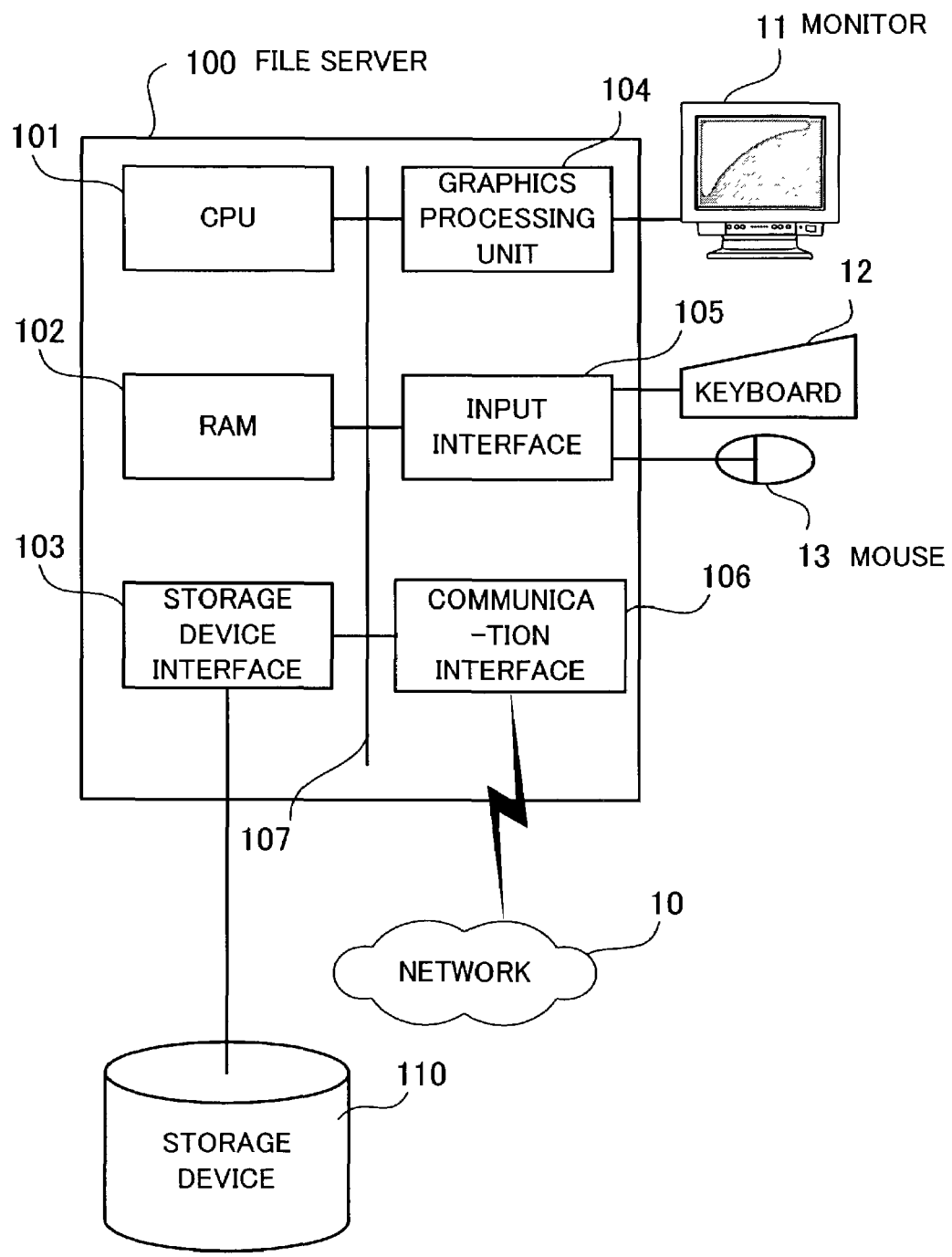
FIG. 3 is a view showing the hardware structure of a file server used in the embodiment of the present invention.

FIG. 3 is a view showing the hardware structure of a file server used in the embodiment of the present invention. The whole of a file server 100 is controlled by a central processing unit (CPU) 101. A random access memory (RAM) 102, a storage device interface 103, a graphics processing unit 104, an input interface 105, and a communication interface 106 are connected to the CPU 101 via a bus 107.

The RAM 102 temporarily stores at least part of operating system (OS) programs and application programs executed by the CPU 101. The RAM 102 also stores various pieces of data necessary for processing by the CPU 101. A storage device 110 is connected to the storage device interface 103. The storage device interface 103 controls the operation of the storage device 110 and writes data to or reads data from the storage device 110 in compliance with a request from the CPU 101. The storage device 110 is, for example, a hard disk drive (HDD). The storage device 110 stores an OS, application programs, and various pieces of data including divided file data.

A monitor 11 is connected to the graphics processing unit 104. The graphics processing unit 104 causes images to be displayed on a screen of the monitor 11 in compliance with an instruction from the CPU 101. A keyboard 12 and a mouse 13 are connected to the input interface 105. The input interface 105 sends a signal sent from the keyboard 12 or mouse 13 to the CPU 101 via the bus 107.

The communication interface 106 is connected to a network 10. The communication interface 106 sends data to or receives data from another computer via the network 10.

By adopting the above hardware structure, the processing function of the first embodiment can be realized. FIG. 3 shows the structure of the file server 100. The same hardware structure can be given to the other file servers 200 and 300, the Web clients 21, 22, and 23, the Web server 30, and the application servers 41, 42, and 43.

Now, the processing functions of the file servers 100, 200, and 300 and the application servers 41, 42, and 43 in a system having the structures shown in FIGS. 2 and 3 will be described. Each of the file servers 100, 200, and 300 has the same processing function, so only the function of the file server 100 will be described. Similarly, each of the application servers 41, 42, and 43 has the same processing function, so only the function of the application server 41 will be described.

Figure 4:
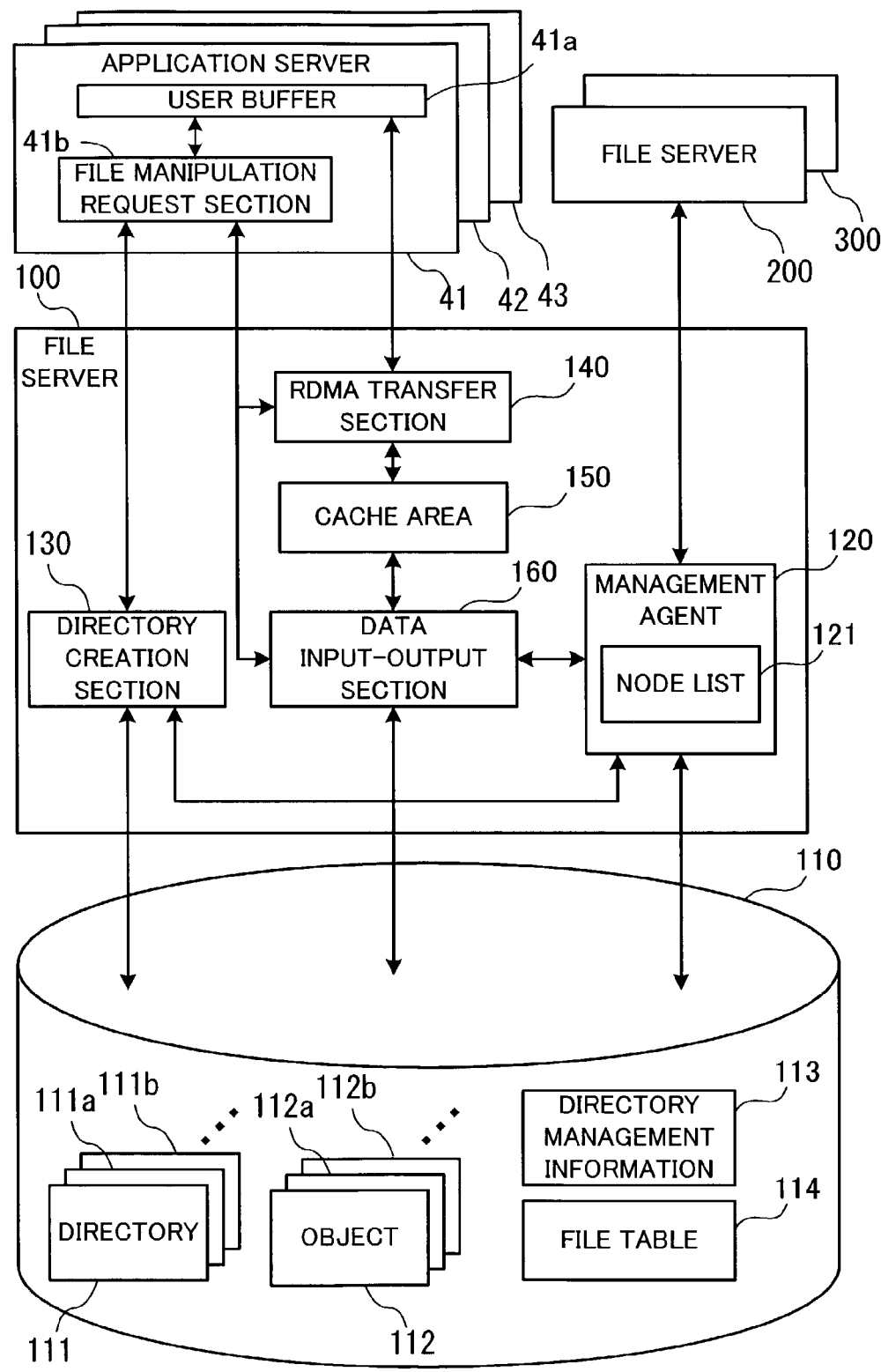
FIG. 4 is a functional block diagram of the application server and the file server in the first embodiment.

FIG. 4 is a functional block diagram of the application server and the file server in the first embodiment.

The application server 41 includes a user buffer 41a and a file manipulation request section 41b. The user buffer 41a is a storage area used by a process for performing a process requested by the Web server 30. The file manipulation request section 41b sends a request to manipulate a file, such as a request to create a directory, a request to write a file, or a request to read a file, to each of the file servers 100, 200, and 300.

The storage device 110 connected to the file server 100 stores directories 111, 111a, 111b, ..., objects 112, 112a, 112b, ..., directory management information 113, and a file table 114. The directories 111, 111a, 111b, ... are created by the file server 100. Information regarding files under each directory is registered with it. Each of the objects 112, 112a, 112b, ... is part of each file managed by an entire cluster. The directory management information 113 is management information regarding the directories 111, 111a, 111b, ....

The file table 114 is a list of file information including information indicative of how one file is distributed in an entire cluster. This file information includes the attribute (for example, update time and creator) of a file. File information for one file is managed by one of the file servers 100, 200, and 300 included in the cluster. That is to say, file information regarding a file created by the file server 100 is registered with the file table 114 for the file server 100. Similarly, each of the file servers 200 and 300 has an original file table (the node ID of a file server appears in a file ID included in file information in a file table).

If the file server 100 makes a change in the original file table 114, then the file table 114 is flagged as changed by a data input-output section 160. If the file server 100 manipulates a file the original file table of which the file server 100 does not have, a copy of that file table is made. If the file table 114 copied this time has not been changed after being copied the last time, then the file server 100 uses a copy of the file table 114 made the last time.

The file server 100 includes a management agent 120, a directory creation section 130, a remote direct memory access (RDMA) transfer section 140, a cache area 150, and the data input-output section 160.

The management agent 120, for example, coordinates the contents of a node list 121 and the file table 114 and sends or receives the directory 111, in cooperation with management agents on the other file servers 200 and 300.

For example, if a new file server is added onto the network 10, then a management agent on the added file server detects another file server on the network 10 and connects the added file server to it. The added file server writes the node ID of the file server to which it is connected into the node list. The existing file server to which the added file server is connected recognizes the new file server by receiving a request for connection and adds the node ID of the added file server onto its node list.

Furthermore, if the file server 100 refers to the file table the file server 200 or 300 has, the management agent 120 refers to the original file table managed by the file server 200 or 300. If this original file table has been changed after being referred to the last time by the management agent 120, then the management agent 120 makes a copy of the file table it referred to and manages the copy for itself.

Moreover, when the management agent 120 receives a request from the directory creation section 130 to obtain directory information, the management agent 120 sends a request to obtain directory information to the file server 200 or 300 in response to the request from the directory creation section 130. Then the management agent 120 passes directory information sent from the file server 200 or 300 to the directory creation section 130. In contrast with this, when the management agent 120 receives a request from the file server 200 or 300 to obtain directory information, the management agent 120 reads directory information specified by the request from the directory 111, 111a, 111b, ... or directory management information 113 in the storage device 110. Then the management agent 120 sends the directory information read from the storage device 110 to the file server which output the request to obtain directory information.

Various pieces of directory information are exchanged between the management agent 120 and the file server 200 or 300. These pieces of directory information include a parent directory to a directory, the node ID of a file server which created a directory under the parent directory the last time, and copies of the directories 111, 111a, 111b, ....

The directory creation section 130 creates a directory in the storage device 110 in response to a request from the application server 41, 42, or 43 to create a directory. To be concrete, judgment conditions for judging whether the file server 100 itself should take charge of the process of creating a directory are predefined in the directory creation section 130. When the directory creation section 130 receives a request from the application server 41, 42, or 43 to create a directory, the directory creation section 130 judges on the predefined judgment conditions whether the directory should be managed by the file server 100. Only if the directory creation section 130 judges that a directory should be created, the directory creation section 130 creates only the directory 111 that should be managed by the file server 100 in the storage device 110.

In the first embodiment, the condition that it should be the file server 100's turn to take charge of the process of creating a directory under a common parent directory has been defined as a condition for judging whether to create a directory. The order of taking charge of the process of creating a directory complies with the order of registration on the node list 121.

That is to say, when the directory creation section 130 receives a request from the application server 41, 42, or 43 to create a directory, the directory creation section 130 first finds which file server created a directory the last time under a parent directory to a directory to be created. For that reason, the directory creation section 130 informs the management agent 120 of a request to obtain the node ID of the appropriate file server. Then the management agent 120 performs the process of obtaining the node ID of the appropriate file server and passes a node ID it obtained to the directory creation section 130.

The directory creation section 130 judges whether the node ID passed from the management agent 120 is just before the file server 100 on the node list 121. If the file server 100's turn comes just after the node ID passed from the management agent 120, then the directory creation section 130 creates a directory in compliance with the request to create a directory.

When the directory creation section 130 creates a directory, the directory creation section 130 registers information corresponding to the directory with the directory management information 113.

The RDMA transfer section 140 exchanges file data with the application server 41, 42, or 43 by a data transfer method called RDMA. RDMA transfer is data transfer in which a source address and destination address are specified. By performing RDMA transfer, data at a specified address in the user buffer 41*a* in the application server 41, for example, can be transferred to the cache area 150. Moreover, by performing RDMA transfer, data stored in the cache area 150 can be transferred to a specified address in the user buffer 41*a* in the application server 41.

The cache area 150 is a storage area for temporarily storing data exchanged between the file server 100 and the application server 41, 42, or 43. The cache area 150 is part of a storage area in the RAM 102 shown in FIG. 3.

The data input-output section 160 inputs data to or outputs data from the storage device 110 in response to a request from the application server 41, 42, or 43. To be concrete, a rule for dividing a file and a rule for selecting file data to be managed by the file server 100 from file data generated by division are predefined in the data input-output section 160 as judgment conditions used when a request to write a file is handled.

When the data input-output section 160 receives a request to write a file, the data input-output section 160 judges whether there is file data to be managed by the file server 100. If there is file data to be managed by the file server 100, the data input-output section 160 requests the RDMA transfer section 140 to transfer the appropriate file data. Then the data input-output section 160 reads the transferred file data from the cache area 150 and writes it into the storage device 110 as one object. At this time the data input-output section 160 registers information regarding the file which contained the stored object 112 with the file table 114.

Furthermore, the condition that a file specified by a request for reading or part (file data) of a file specified by a request for reading should be stored in the storage device 110 managed by the data input-output section 160 is defined in the data input-output section 160 as a judgment condition for handling a request to read a file. When the data input-output section 160 receives a request to read a file, the data input-output section 160 judges whether at least part of the file to be read is stored in the storage device 110.

For example, if the object 112 included in the file to be read is stored in the storage device 110, then the data input-output section 160 reads the object 112 from the storage device 110 and stores it in the cache area 150. The object 112 stored in the cache area 150 is transferred by the RDMA transfer section 140 to an application server which output the request to read a file.

Now, the structure of data managed by the file server 100 will be described.

Figure 5:
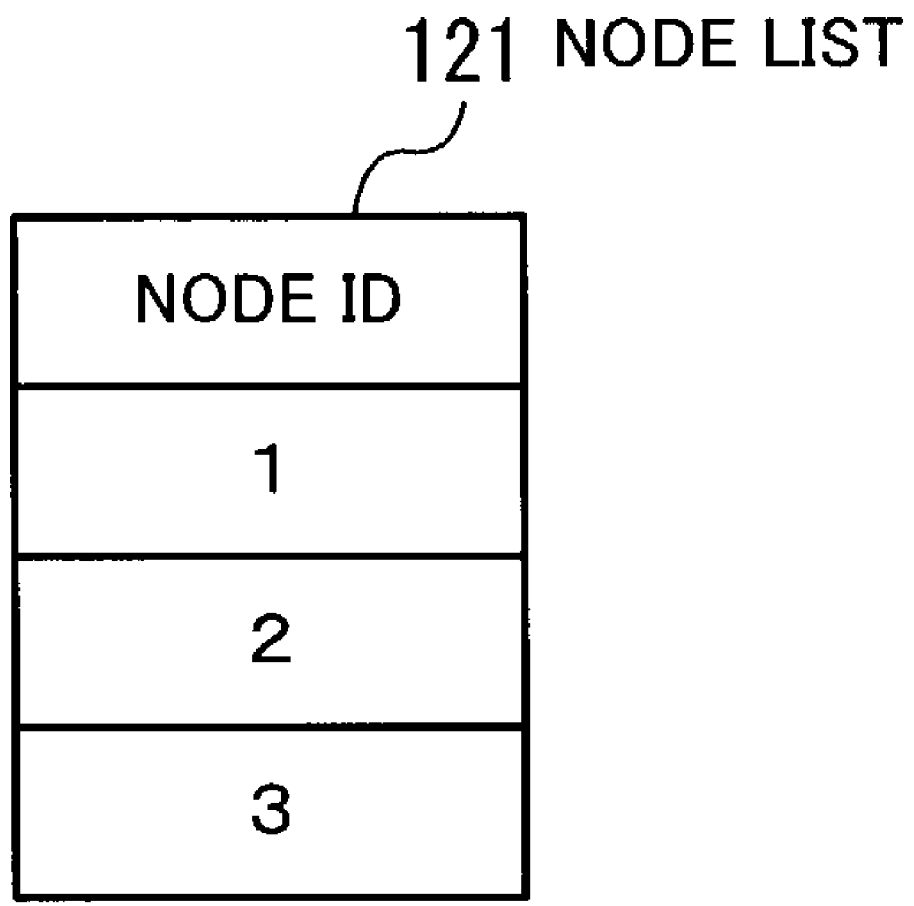
FIG. 5 is a view showing the structure of data in a node list.

FIG. 5 is a view showing the structure of data in a node list. The order in which the file servers 100, 200, and 300 take charge of the process of creating a directory is defined on the node list 121. In this example, a file server having a node ID which ranks higher on the node list 121 will precede in the above order. The order in which the file servers 100, 200, and 300 create a directory is determined on the basis of the order in which node IDs appear in the node list 121. This order will return from the last node ID on the node list 121 to the first node ID on the node list 121.

FIG. 6 is a view showing the structure of data in a directory. The directory 111 stores combinations of the directory names and file IDs (no distinction is made between a directory and file as identification information) of directories under it and combinations of the file names and file IDs of files under it. When a directory or file is created or removed by the file server 100, 200, or 300, a file server having a parent directory to the directory or file to be manipulated is informed of the content of the manipulation by the function of a management agent on each of the file servers 100, 200, and 300. This keeps the contents of the directory 111 up-to-date.

Now, the objects 112, 112*a*, and 112*b* will be described. The objects 112, 112*a*, and 112*b* are created as a result of distributively storing a file.

Figure 7:
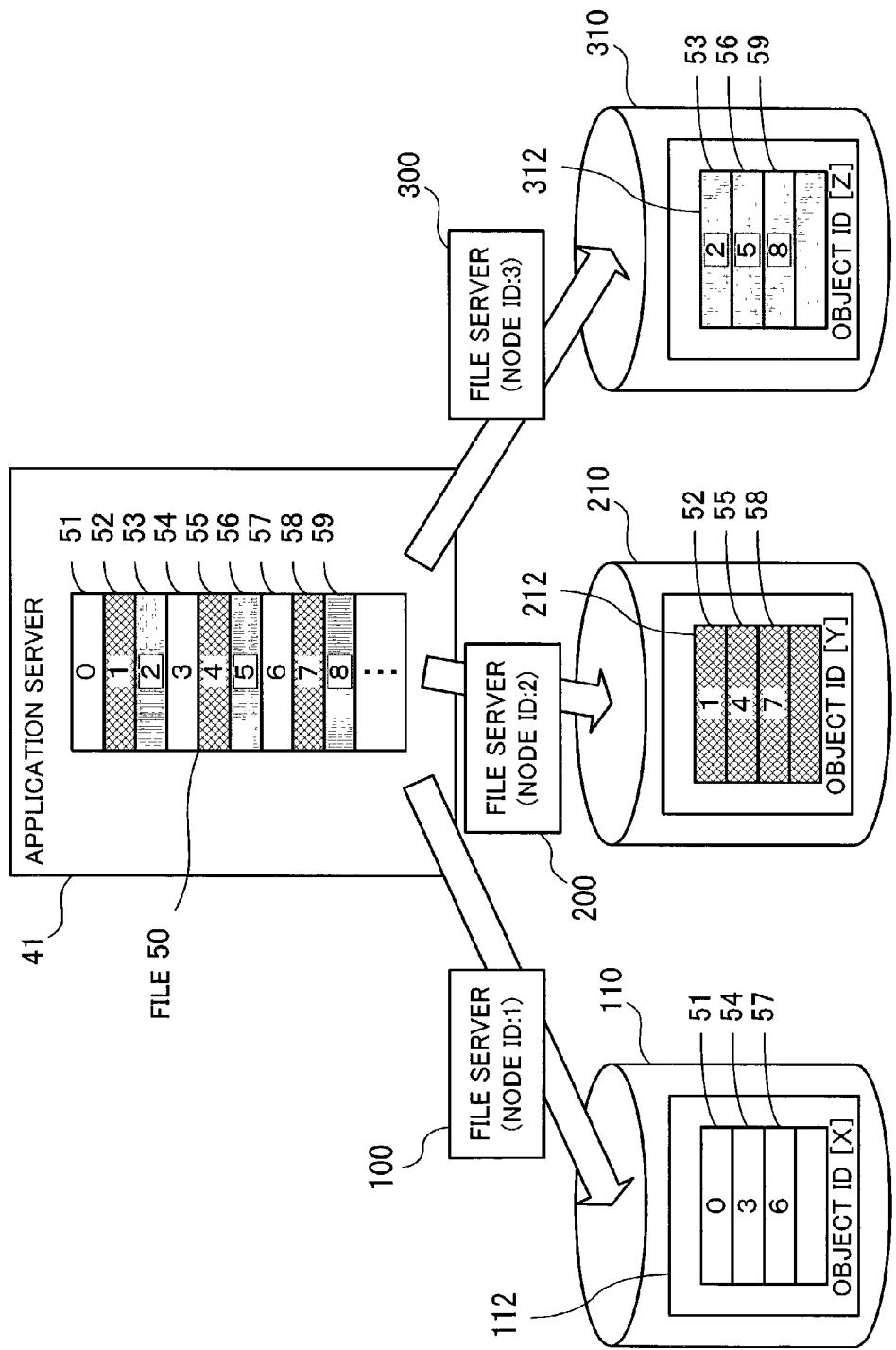
FIG. 7 is a view showing how a file is stored distributively.

FIG. 7 is a view showing how a file is stored distributively. If a file 50 stored on the application server 41 is stored distributively on the file servers 100, 200, and 300, the file 50 is divided into a plurality of pieces of file data 51, . . . , 59, . . . having predetermined length. The divided file data 51, . . . , 59, . . . are sent distributively to the file servers 100, 200, and 300. It is assumed that the file data 51, . . . , 59, . . . generated by dividing the file 50 are given identification numbers, which start from zero, in order from the head.

The file server 100 creates the object 112 of the file data 51, 54, 57, . . . of the identification numbers "0," "3," "6," . . . , respectively, sent from the application server 41 and stores it in the storage device 110. The object 112 is given the object ID [X].

The file server 200 creates an object 212 of the file data 52, 55, 58, . . . of the identification numbers "1," "4," "7," . . . , respectively, sent from the application server 41 and stores it in a storage device 210. The object 212 is given the object ID [Y].

The file server 300 creates an object 312 of the file data 53, 56, 59, . . . of the identification numbers "2," "5," "8," . . . , respectively, sent from the application server 41 and stores it in a storage device 310. The object 312 is given the object ID [Z].

As stated above, the file data 51 through 59, . . . are allocated in order from the head to the file servers 100, 200, and 300 one at a time. The file data 51 through 59, . . . are managed by the file servers 100, 200, and 300 to which they were allocated.

Figure 8:
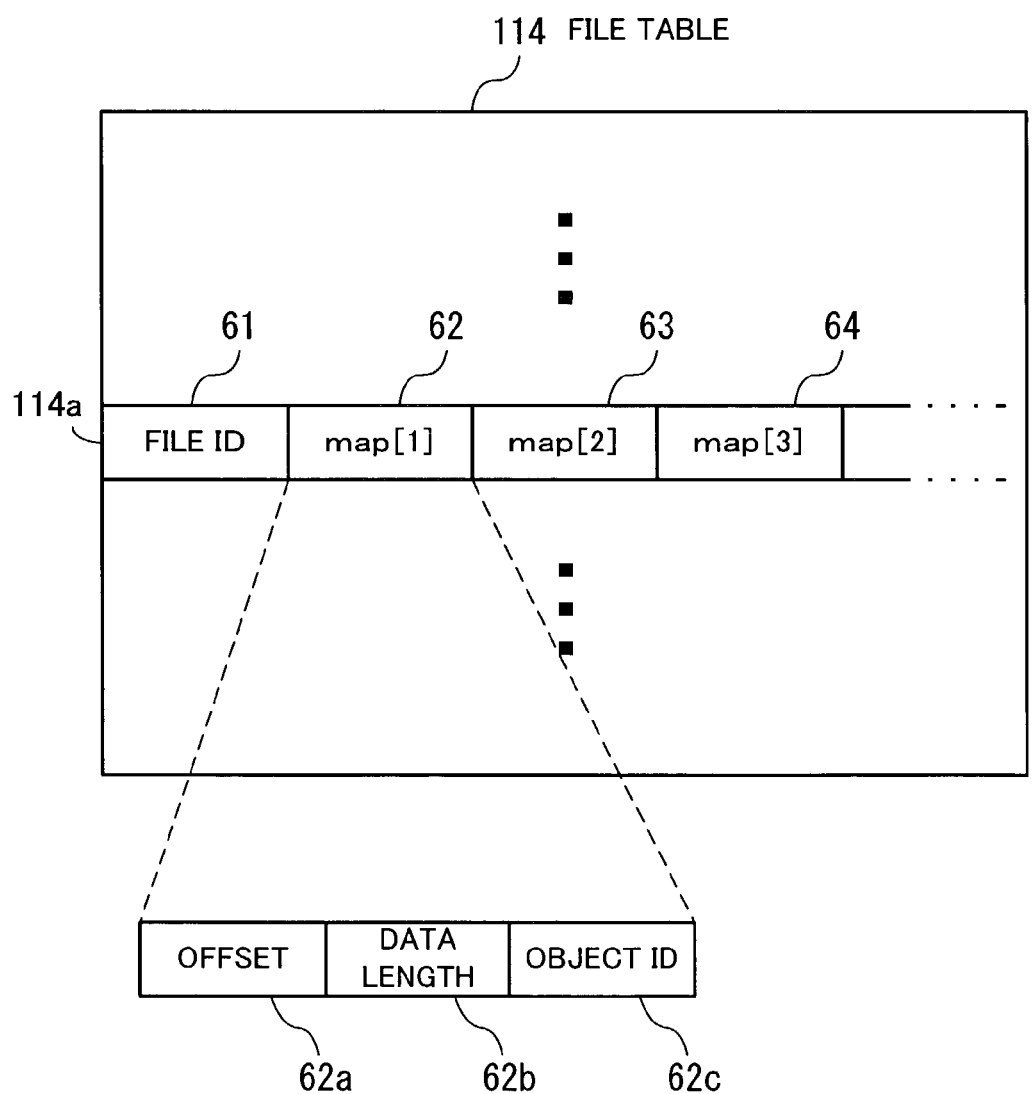
FIG. 8 is a view showing the structure of data in a file table.

FIG. 8 is a view showing the structure of data in a file table. The file table 114 stores file information 114*a* regarding each file managed by the cluster. The file information 114*a* includes an file ID 61 and map information (map[1], map[2], and map[3]) 62 through 64.

The file ID 61 is identification information for a file distributively stored.

The map information 62 through 64 correspond to the file servers 100, 200, and 300 respectively. In FIG. 8, numbers in brackets included in letters (map[1], map[2], and map[3]), which indicate the map information 62 through 64 respectively, are the node IDs of the corresponding file servers. The map information 62 through 64 are information regarding objects managed by the corresponding file servers 100, 200, and 300 respectively.

Information regarding the object 112 managed by the file server 100 is registered with the map information 62. The map information 62 includes an offset 62a, data length 62b, and an object ID 62c. The offset 62a is the offset address to the head of the object 112 corresponding to the map information 62 given when the objects 112, 212, and 312 which make up the file 50 are combined. The data length 62b is the length (capacity) of data contained in the object 112 corresponding to the map information 62. The object ID 62c is the object ID [X] of the object 112 corresponding to the map information 62.

The map information 63 has the same data structure as the map information 62. Information regarding the object 212 is registered with the map information 63. Therefore, the object ID [Y] of the object 212 is registered in the File ID field of the map information 63.

The map information 64 has the same data structure as the map information 62. Information regarding the object 312 is registered with the map information 64. Therefore, the object ID [Z] of the object 312 is registered in the File ID field of the map information 64.

Now, offset values registered with the map information 62 through 64 will be described in detail.

Figure 9:
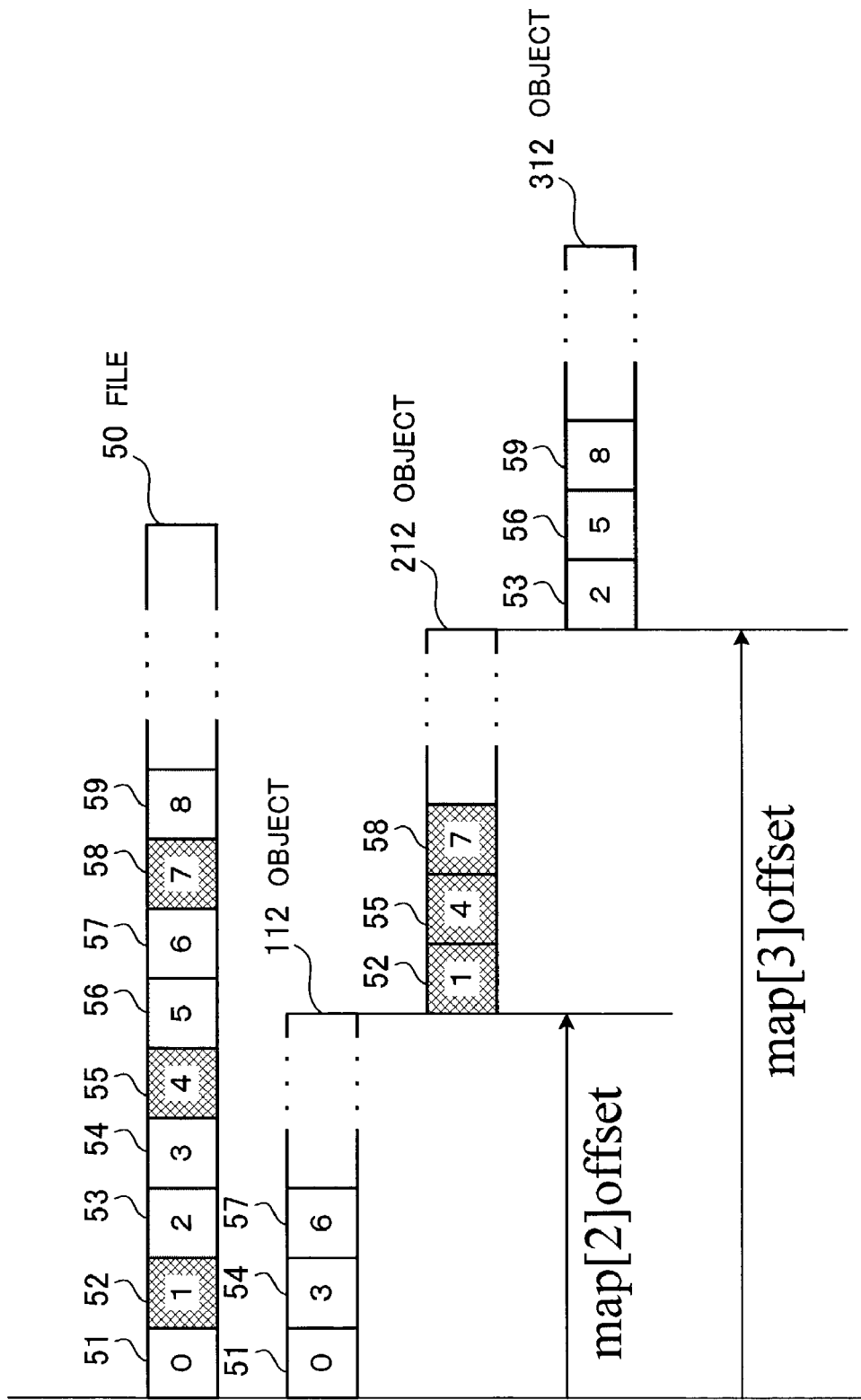
FIG. 9 is a view for describing an offset registered with map information.

FIG. 9 is a view for describing an offset registered with map information. Offsets from the head given when the objects 112, 212, and 312 are combined in that order are set in the Offset fields of the map information 62 through 64 corresponding to the objects 112, 212, and 312 respectively. Therefore, an offset registered with the map information 62 corresponding to the object 112 is zero. An offset registered with the map information 63 corresponding to the object 212 is a value equal to the length of data contained in the object 112. An offset registered with the map information 64 corresponding to the object 312 is a value equal to the total of the length of data contained in the object 112 and the length of data contained in the object 212.

Figure 10:
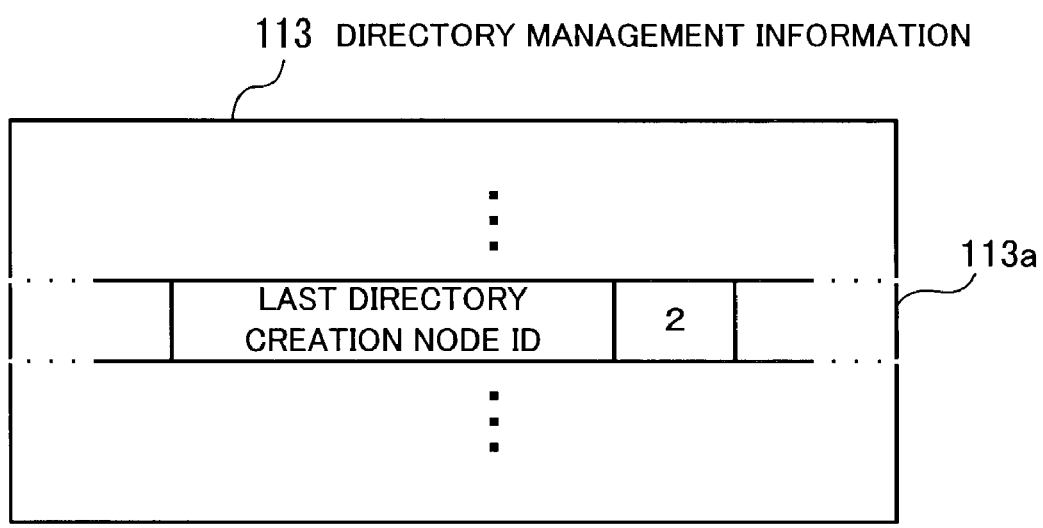
FIG. 10 is a view showing the structure of data in directory management information.

FIG. 10 is a view showing the structure of data in directory management information. Management information 113a for each directory managed by the file server 100 is registered with the directory management information 113. A last directory creation node ID is registered as a piece of management information. The node ID of a file server which created a directory (child directory) the last time under a directory corresponding to the management information 113a is registered in the Last Directory Creation Node ID field. In this example, the node ID "2" is registered.

Now, processes performed by a system having the above structure will be described.

First, the process of ensuring the identity of the node list 121 will be described.

Figure 11:
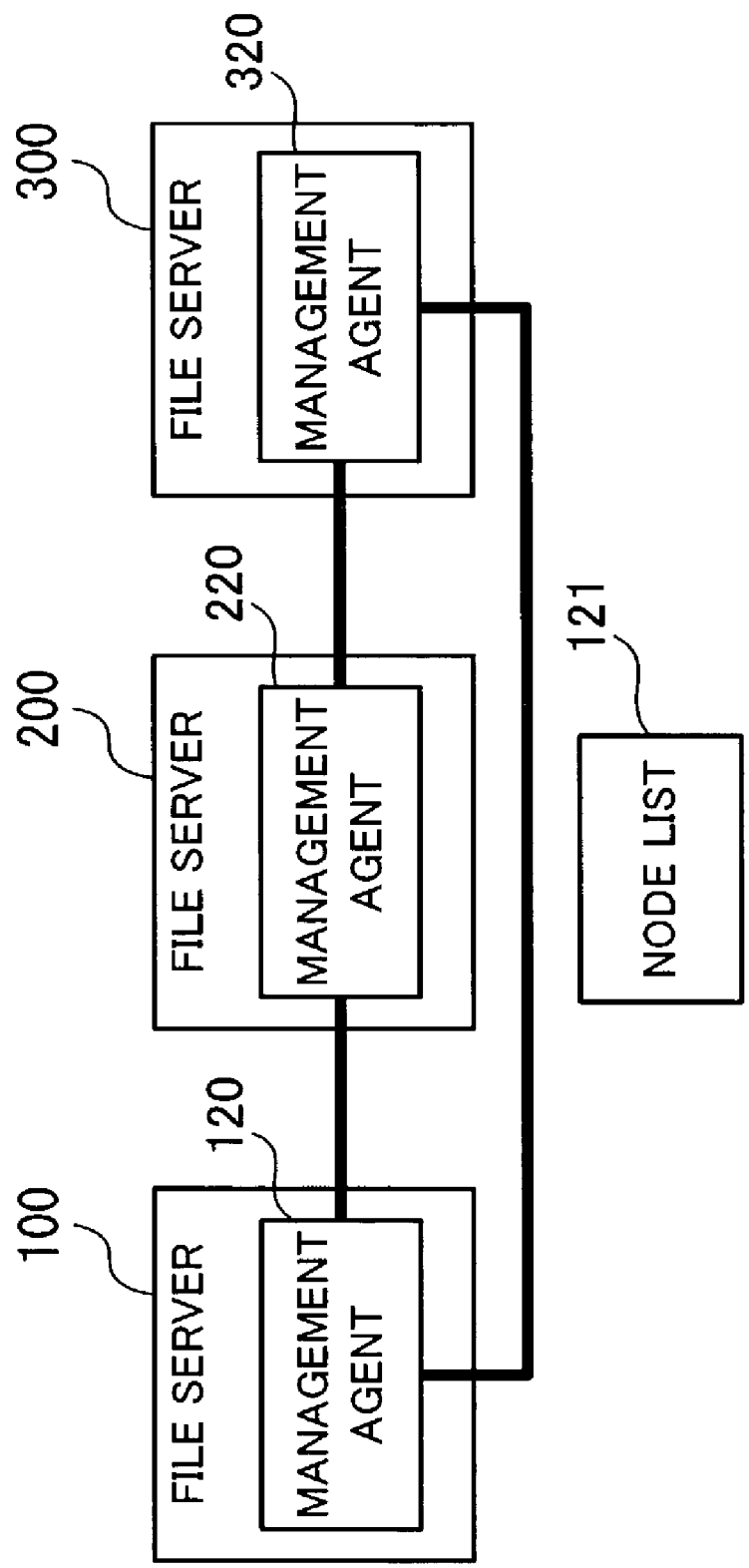
FIG. 11 is a schematic view of the process of ensuring the identity of a node list.

FIG. 11 is a schematic view of the process of ensuring the identity of a node list. The management agents 120, 220, and 320 on the file servers 100, 200, and 300, respectively, inform one another of the contents of the node list 121. If the contents of the node list 121 were updated on one file server, the other file servers are informed of the updated node list 121. When each file server receives the updated node list 121, it updates the contents of a node list it manages according to the contents of the updated node list 121. As a result, the identity of the contents of the node list 121 will be maintained on the plurality of file servers 100, 200, and 300.

Now, the process of creating a directory will be described.

Figure 12:
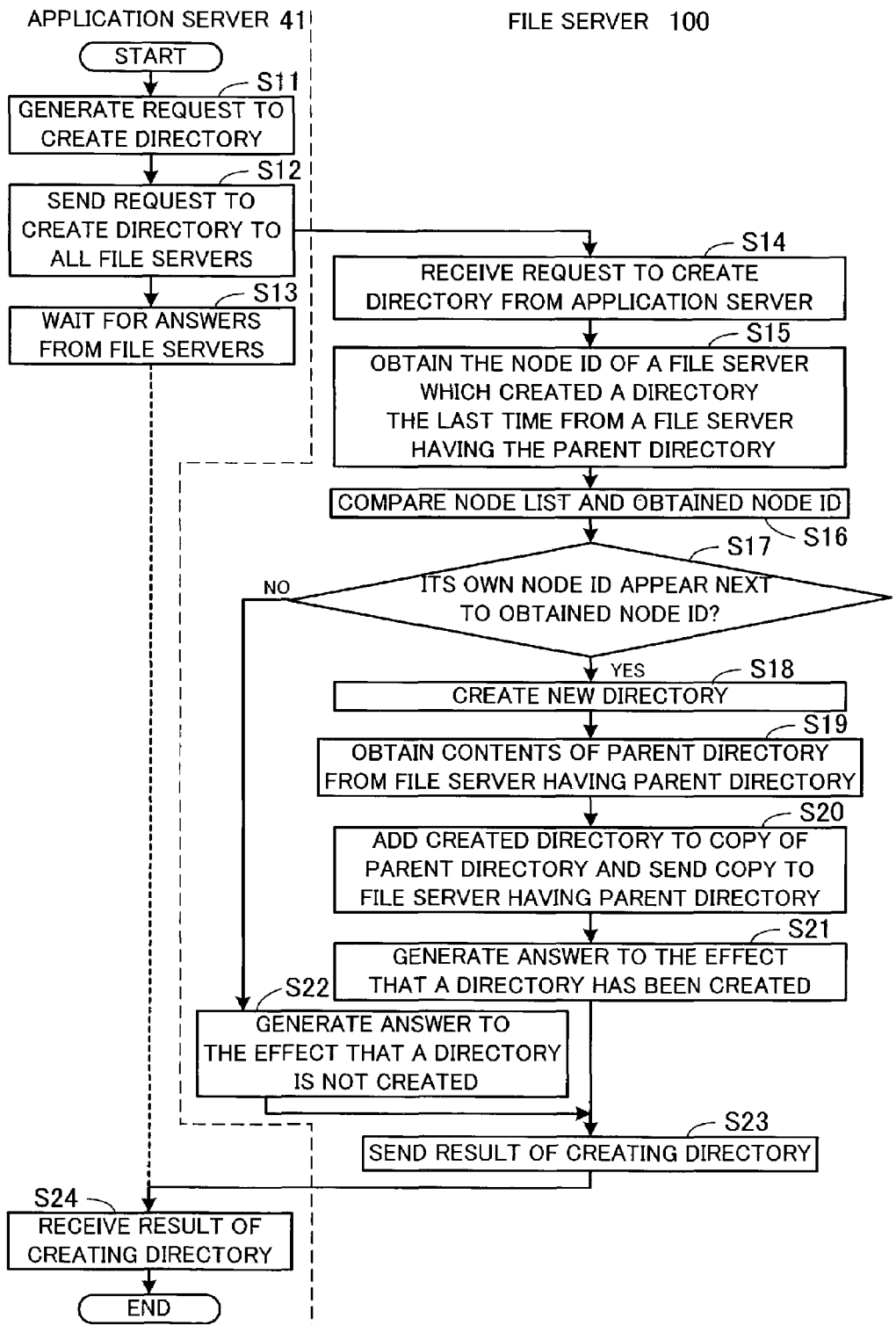
FIG. 12 is a flow chart showing the procedure of the process of creating a directory.

FIG. 12 is a flow chart showing the procedure of the process of creating a directory. Processing procedures to be followed by the application server 41 and file server 100 are shown in FIG. 12. The processing procedure to be followed by the application server 41 is shown on the left side of FIG. 12 and the processing procedure to be followed by the file server 100 is shown on the right side of FIG. 12. Now, the process shown in FIG. 12 will be described in order of step number.

[Step S11] The file manipulation request section 41b in the application server 41 generates a request to create a directory. The generated request to create a directory includes information regarding a parent directory to a directory to be created (including the node ID of a file server which created the parent directory).

[Step S12] The file manipulation request section 41b sends the request to create a directory to all the file servers 100, 200, and 300. Then the application server 41 proceeds to step S13 and the file server 100 begins step S14.

[Step S13] The file manipulation request section 41b waits for answers from the file servers 100, 200, and 300.

[Step S14] The directory creation section 130 in the file server 100 receives the request to create a directory from the application server 41.

[Step S15] The directory creation section 130 obtains the node ID of a file server which created a directory under the parent directory the last time from a file server having the parent directory.

To be concrete, the directory creation section 130 extracts the information regarding the parent directory from the request to create a directory. The directory creation section 130 passes the information it extracted to the management agent 120 and requests the management agent 120 to obtain the node ID of a node which created a directory under the parent directory the last time.

Then the management agent 120 realizes the node ID of a file server which created the parent directory from the information regarding the parent directory. The management agent 120 outputs a request to obtain the node ID of a file server which created a directory under the parent directory the last time to the file server which created the parent directory. A management agent on the file server which received this request refers to directory management information for the parent directory and obtains the node ID of a file server which created a directory under the parent directory the last time. Then the management agent on the file server which created the parent directory sends the node ID it obtained to the file server 100 which output the request to obtain the node ID. The node ID sent is received by the management agent 120 on the file server 100 and is passed to the directory creation section 130.

[Step S16] The directory creation section 130 compares the node list 121 the management agent 120 holds and the node ID it obtained.

[Step S17] The directory creation section 130 judges whether its own (the file server 100's) node ID appears next to a file server of the node ID it obtained on the node list 121. If its own node ID is set next to a file server of the node ID it obtained, then step S18 will be performed. If its own node ID is not set next to a file server of the node ID it obtained, then step S22 will be performed.

[Step S18] The directory creation section 130 creates a new directory in compliance with the request to create a directory.

[Step S19] The directory creation section 130 obtains the contents of the parent directory from the file server having the parent directory.

To be concrete, the directory creation section 130 requests the management agent 120 to obtain the parent directory. In response to the request from the directory creation section 130 the management agent 120 outputs a request to obtain a directory to the file server having the parent directory. Then a management agent on the file server having the parent directory makes a copy of the contents of the parent directory and sends it to the file server 100. The copy of the parent directory sent is passed from the management agent 120 to the directory creation section 130.

[Step S20] The directory creation section 130 adds information regarding the directory it created to the copy of the parent directory. Then the directory creation section 130 sends an updated copy of the parent directory to the file server having the parent directory. Practically, an updated copy of the parent directory is sent in the following way. The updated copy of the parent directory is passed first to the management agent 120. Then the management agent 120 sends the copy of the parent directory updated by the directory creation section 130 to the file server having the parent directory. When the file server having the parent directory receives the updated copy of the parent directory, the management agent on it updates directory management information for the parent directory according to the contents of the received copy.

[Step S21] The directory creation section 130 generates an answer to the effect that it has created a directory. Then step S23 will be performed.

[Step S22] The directory creation section 130 generates an answer to the effect that it does not create a directory.

[Step S23] The directory creation section 130 sends the result of creating a directory as an answer to the request to create a directory. Then the process by the file server 100 terminates and the application server 41 begins step S24.

[Step S24] The file manipulation request section 41*b* in the application server 41 receives the result of creating a directory from each of the file servers 100, 200, and 300 and terminates the process.

Figure 13:
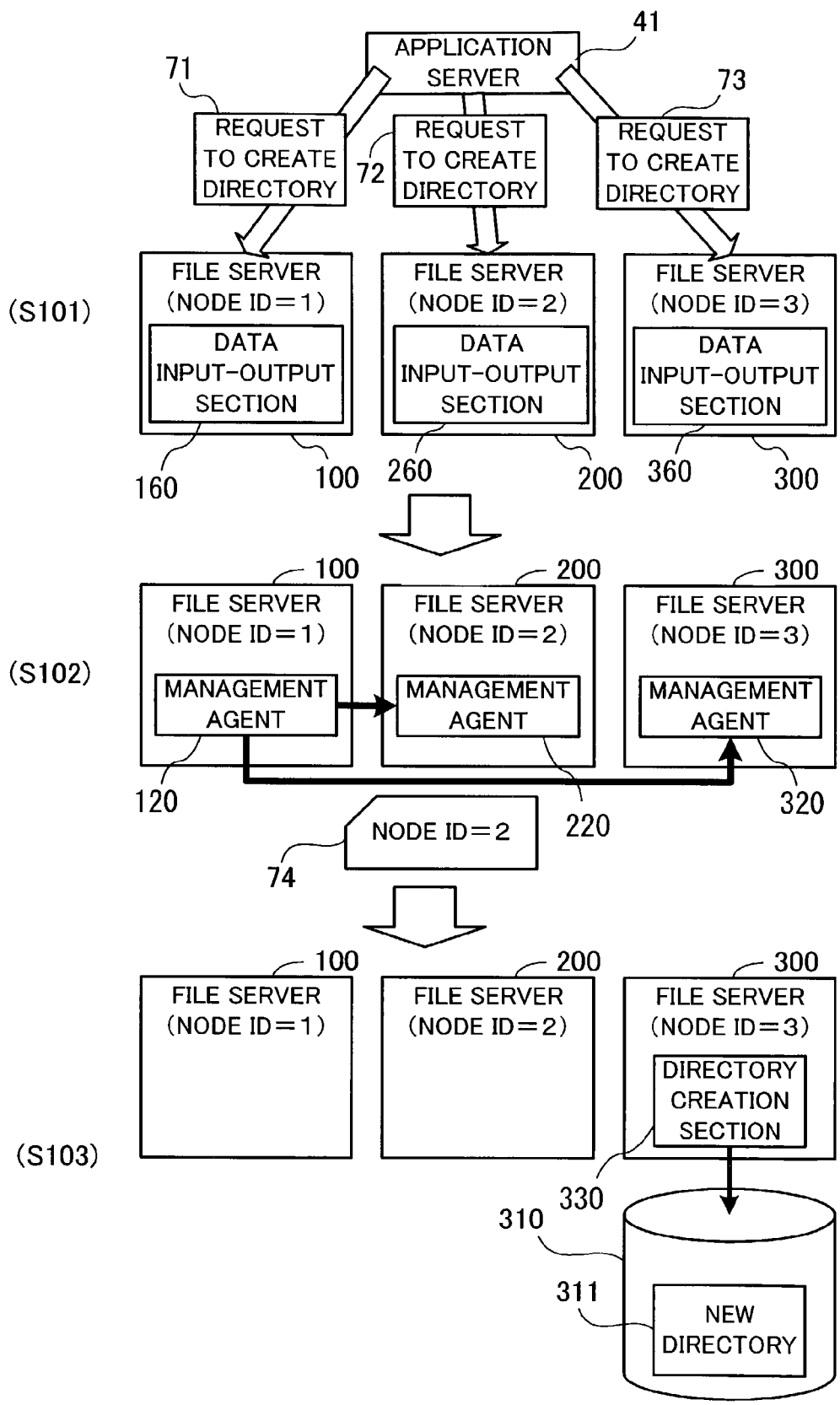
FIG. 13 is the first half of a schematic view of the process of creating a directory.

FIG. 13 is the first half of a schematic view of the process of creating a directory. In this example, a new directory is created under a directory the file server 100 has in response to a request from the application server 41. It is assumed that the file server 200 of the node ID "2" created a directory the last time under the directory the file server 100 has.

[Step S101] A request 71 to create a directory is sent from the application server 41 to the file server 100. Similarly, a request 72 to create a directory is sent from the application server 41 to the file server 200 and a request 73 to create a directory is sent from the application server 41 to the file server 300. The contents of the requests 71 through 73 to create a directory are the same, but they differ only in destination.

[Step S102] The file server 100 having a parent directory to a directory to be newly created informs the other file servers 200 and 300 of a node ID 74 (node ID=2, in this example) of the file server 200 which created a directory under the parent directory the last time.

[Step S103] A directory creation section 330 in the file server 300 corresponding to the node ID "3" which appears next to the node ID "2" on the node list 121 creates a new directory 311 in the storage device 310.

Figure 14:
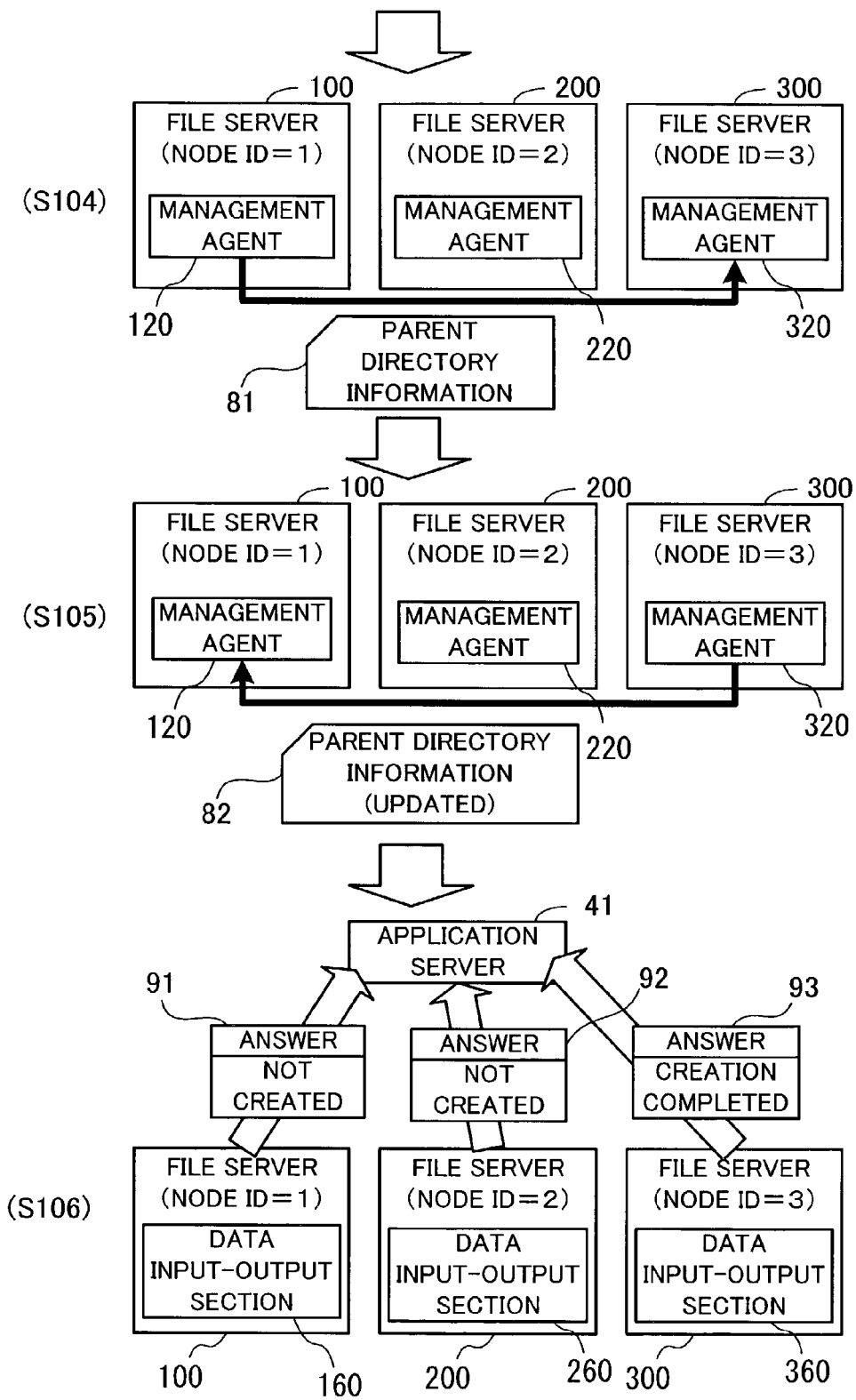
FIG. 14 is the second half of the schematic view of the process of creating a directory.

FIG. 14 is the second half of the schematic view of the process of creating a directory.

[Step S104] The management agent 320 on the file server 300 which created the new directory 311 receives parent directory information (a copy of the contents of the parent directory) 81 from the file server 100.

[Step S105] The management agent 320 on the file server 300 updates the copy of the parent directory and sends updated parent directory information 82 to the file server 100.

[Step S106] The file server 100 returns an answer 91 to the request 71 to create a directory to the effect that it does not create a directory (not created) to the application server 41. The file server 200 returns an answer 92 to the request 72 to create a directory to the effect that it does not create a directory (not created) to the application server 41. The file server 300 returns an answer 93 to the request 73 to create a directory to the effect that it has created a directory (creation completed) to the application server 41.

By performing the above process, a new directory will be created on one of the file servers 100, 200, and 300 included in a cluster.

Now, the process of writing a file will be described.

Figure 15:
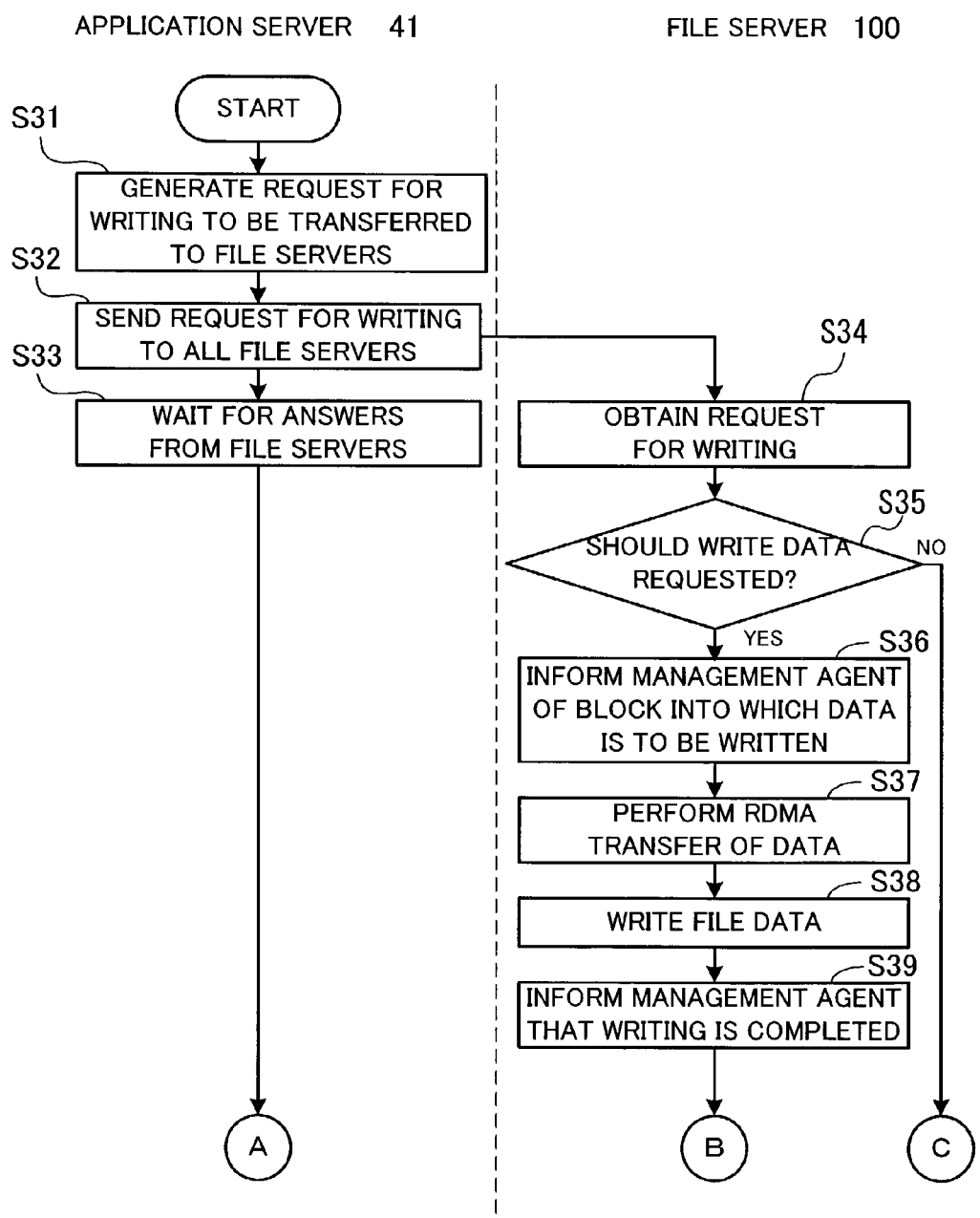
FIG. 15 is the first half of a flow chart showing the procedure of the process of writing a file.

FIG. 15 is the first half of a flow chart showing the procedure of the process of writing a file. In this example, the application server 41 outputs a request to write a file. Processing procedures to be followed by the application server 41 and file server 100 are shown in FIG. 15. The processing procedure to be followed by the application server 41 is shown on the left side of FIG. 15 and the processing procedure to be followed by the file server 100 is shown on the right side of FIG. 15. Now, the process shown in FIG. 15 will be described in order of step number.

[Step S31] The file manipulation request section 41*b* in the application server 41 generates a request for writing to be transferred to the file servers 100, 200, and 300.

[Step S32] The file manipulation request section 41*b* sends the request for writing to all the file servers 100, 200, and 300. Then the application server 41 proceeds to step S33 and the file server 100 begins step S34.

[Step S33] The file manipulation request section 41*b* waits for answers from all the file servers 100, 200, and 300. Then the application server 41 proceeds to step S48 shown in FIG. 16.

[Step S34] The data input-output section 160 in the file server 100 obtains the request for writing from the application server 41.

[Step S35] The data input-output section 160 judges whether to write data contained in a file specified by the request for writing. For example, if the file is divided into a plurality of pieces of file data and there exists a piece of data assigned to the file server 100 itself among them, then the data input-output section 160 judges that it should write data contained in the file. If no piece of data is assigned to the file server 100 itself, then the data input-output section 160 judges that it need not write data contained in the file. If the data input-output section 160 should write data contained in the file, then step S36 will be performed. If the data input-output section 160 need not write data contained in the file, then step S41 shown in FIG. 16 will be performed.

[Step S36] The data input-output section 160 informs the management agent 120 of information regarding a block in the storage device 110 into which the data is to be written.

[Step S37] The RDMA transfer section 140 performs the RDMA transfer of the file data assigned to the file server 100 itself from the user buffer 41*a* in the application server 41 to the cache area 150 in the RAM 102.

[Step S38] The data input-output section 160 writes the plurality of pieces of file data stored in the cache area 150 to the storage device 110 as one object.

[Step S39] The data input-output section 160 informs the management agent 120 that the writing is completed. Then step S43 shown in FIG. 16 will be performed.

Figure 16:
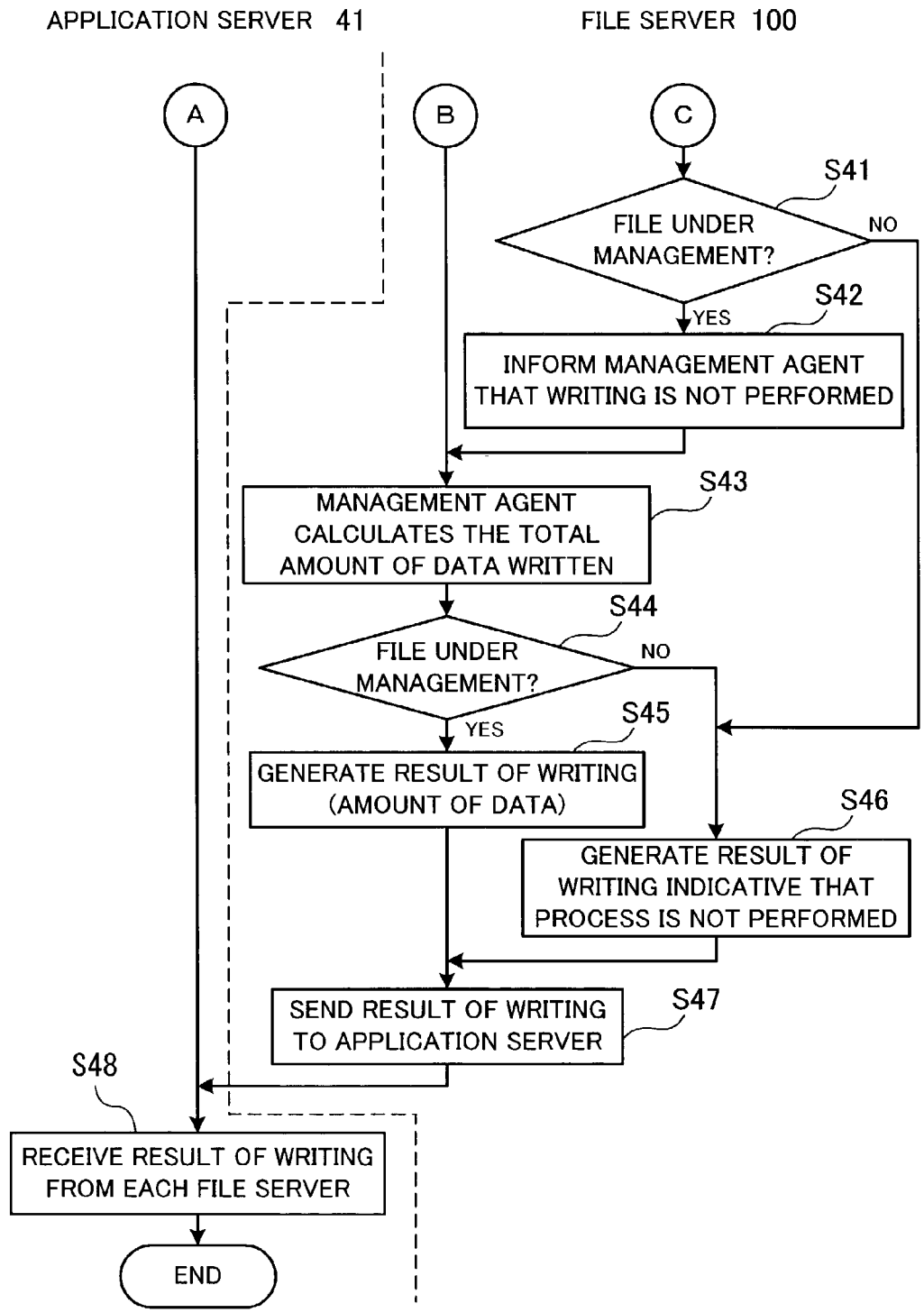
FIG. 16 is the second half of the flow chart showing the procedure of the process of writing a file.

FIG. 16 is the second half of the flow chart showing the procedure of the process of writing a file. Now, the process shown in FIG. 16 will be described in order of step number.

[Step S41] The data input-output section 160 judges whether the file to be manipulated is managed by the file server 100 itself. To be concrete, the file ID of the file to be manipulated includes the node ID of a file server which manages file information for the file.

The data input-output section 160 therefore compares the node ID included in the file ID and the node ID of the file server 100 itself. If these node IDs match as a result of the comparison, then the data input-output section 160 judges that the file to be manipulated is managed by the file server 100 itself. If these node IDs do not match, then the data input-output section 160 judges that the file to be manipulated is not managed by the file server 100 itself. If the file to be manipulated is managed by the file server 100 itself, then step S42 will be performed. If the file to be manipulated is not managed by the file server 100 itself, then step S46 will be performed.

[Step S42] The data input-output section 160 informs the management agent 120 that it does not write the data.

[Step S43] The management agent 120 calculates the total amount of the data written in cooperation with the management agents 220 and 320 on the other file servers 200 and 300. The data input-output section 160 is informed of the result of the calculation.

[Step S44] Whether the file to be manipulated is managed by the file server 100 itself is judged. If the file to be manipulated is managed by the file server 100 itself, then step S45 will be performed. If the file to be manipulated is not managed by the file server 100 itself, then step S46 will be performed.

[Step S45] The data input-output section 160 generates the result of writing including information indicative of the amount of data contained in the object written. Then step S47 will be performed.

[Step S46] The data input-output section 160 generates the result of writing indicative that the process is not performed.

[Step S47] The data input-output section 160 sends the result of writing it generated to the application server 41. Then the process on the file server 100 terminates and the application server 41 performs step S48.

[Step S48] The file manipulation request section 41b in the application server 41 receives the result of writing from each of the file servers 100, 200, and 300 and terminates the process.

As described above, a writing process is performed on the file server 100. A file server which manages file information for a file to be manipulated informs an application server of the result of writing (information indicative that writing is completed normally) including the amount of data. Even if they wrote data, the other file servers inform the application server of the result of manipulation indicative that the file is not manipulated. This can make the application server realize that one file server performed a writing process. Therefore, even if the file is stored distributively, file servers need not perform special processes. The same applies to the process of reading a file described later.

Figure 17:
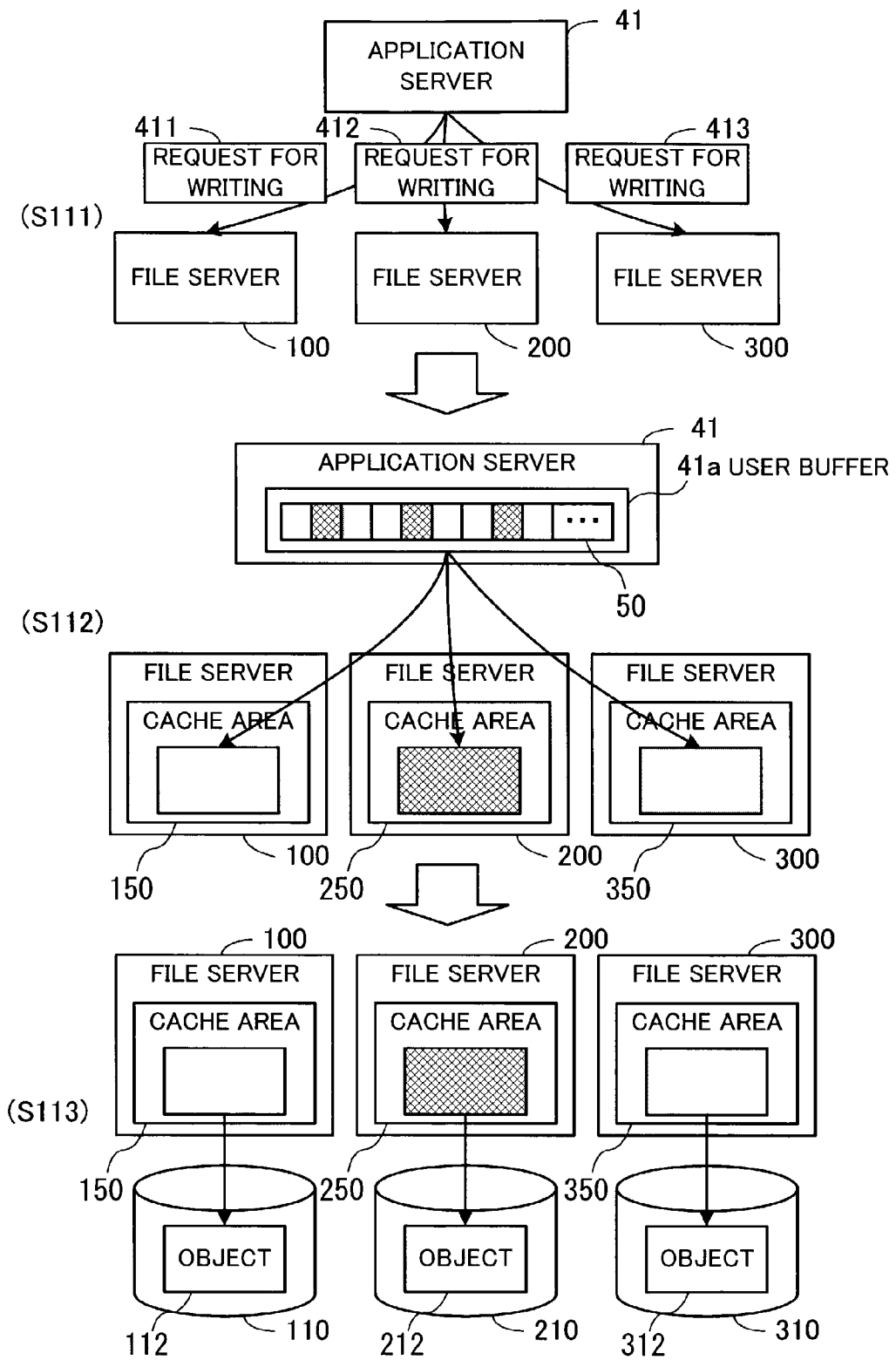
FIG. 17 is a schematic view of a writing process.

FIG. 17 is a schematic view of a writing process.

[Step S111] Requests 411 through 413 for writing are sent from the application server 41 to the file servers 100, 200, and 300 respectively. The contents of the requests 411 through 413 for writing are the same and they differ only in destination.

[Step S112] The file 50 stored in the user buffer 41a in the application server 41 is divided by the file data and is transferred distributively to the plurality of file servers 100, 200, and 300. The file servers 100, 200, and 300 store transferred file data in the cache area 150, a cache area 250, and a cache area 350 respectively.

[Step S113] The file data stored in the cache area 150 in the file server 100 is stored in the storage device 110 as the object 112. Similarly, the file data stored in the cache area 250 in the file server 200 is stored in the storage device 210 as the object 212 and the file data stored in the cache area 350 in the file server 300 is stored in the storage device 310 as the object 312.

A file can be stored distributively in this way.

Now, the process of reading a file will be described.

Figure 18:
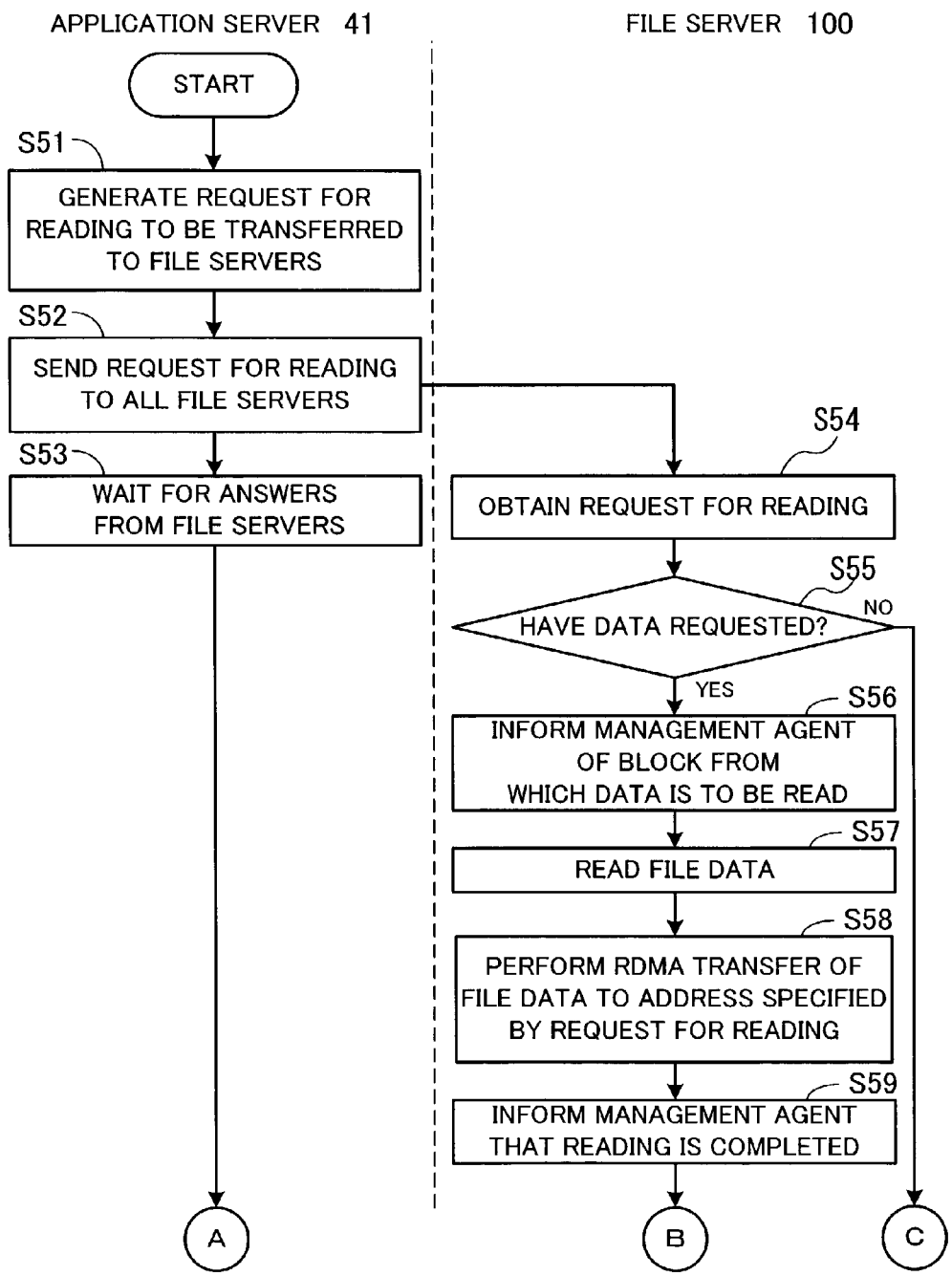
FIG. 18 is the first half of a flow chart showing the procedure of the process of reading a file.

FIG. 18 is the first half of a flow chart showing the procedure of the process of reading a file. Processing procedures to be followed by the application server 41 and file server 100 are shown in FIG. 18. The processing procedure to be followed by the application server 41 is shown on the left side of FIG. 18 and the processing procedure to be followed by the file server 100 is shown on the right side of FIG. 18. Now, the process shown in FIG. 18 will be described in order of step number.

[Step S51] The file manipulation request section 41b in the application server 41 generates a request for reading to be transferred to the file servers 100, 200, and 300. The file manipulation request section 41b can make a request to read data which forms part of a file. In this case, data to be read will be specified by an offset (the differential between the head of the file and a position where the data begins) and the length of the data.

[Step S52] The file manipulation request section 41b sends the request for reading to all the file servers 100, 200, and 300. Then the application server 41 proceeds to step S53 and the file server 100 performs step S54.

[Step S53] The file manipulation request section 41b waits for answers from all the file servers 100, 200, and 300. Then the application server 41 proceeds to step S68 shown in FIG. 19.

[Step S54] The data input-output section 160 in the file server 100 obtains the request for reading from the application server 41.

[Step S55] The data input-output section 160 judges whether the file server 100 has data requested as an object of reading. If the file server 100 has the data to be read, then step S56 will be performed. If the file server 100 does not have the data to be read, then step S61 shown in FIG. 19 will be performed.

[Step S56] The data input-output section 160 informs the management agent 120 of a block in the storage device 110 from which the data is to be read.

[Step S57] The data input-output section 160 reads the file data requested from an object stored in the storage device 110 and writes it into the cache area 150.

[Step S58] The RDMA transfer section 140 performs the RDMA transfer of the data written to the cache area 150 to the user buffer 41a in the application server 41. The destination address of the data is specified by the request for reading.

[Step S59] The data input-output section 160 informs the management agent 120 that the reading is completed. Then step S63 shown in FIG. 19 will be performed.

Figure 19:
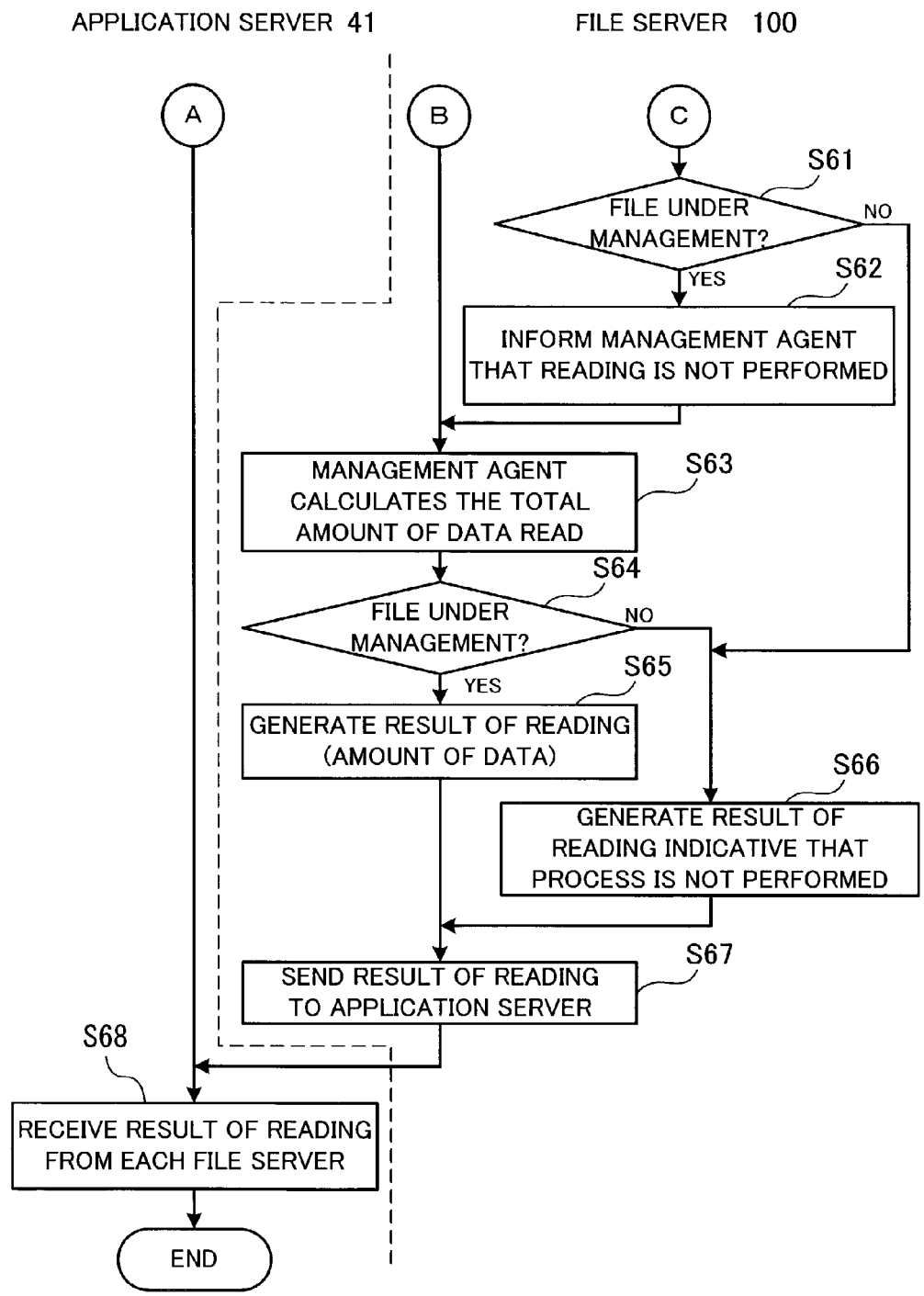
FIG. 19 is the second half of the flow chart showing the procedure of the process of reading a file.

FIG. 19 is the second half of the flow chart showing the procedure of the process of reading a file. Now, the process shown in FIG. 19 will be described in order of step number.

[Step S61] The data input-output section 160 judges whether a file to be manipulated is managed by the file server 100 itself. This judgment can be made by judging whether a node ID included in the file ID of the file to be manipulated and the node ID of the file server 100 itself match. If the file to be manipulated is managed by the file server 100 itself, then step S62 will be performed. If the file to be manipulated is not managed by the file server 100 itself, then step S66 will be performed.

[Step S62] The data input-output section 160 informs the management agent 120 that it does not read the data.

[Step S63] The management agent 120 calculates the total amount of the data read in cooperation with the management agents 220 and 320 on the other file servers 200 and 300. The data input-output section 160 is informed of the result of the calculation.

[Step S64] Whether the file to be manipulated is managed by the file server 100 itself is judged. If the file to be manipulated is managed by the file server 100 itself, then step S65 will be performed. If the file to be manipulated is not managed by the file server 100 itself, then step S66 will be performed.

[Step S65] The data input-output section 160 generates the result of reading indicative of the amount of data transferred. Then step S67 will be performed.

[Step S66] The data input-output section 160 generates the result of reading indicative that the process is not performed.

[Step S67] The data input-output section 160 sends the result of reading to the application server 41. Then the process on the file server 100 terminates and the application server 41 performs step S68.

[Step S68] The file manipulation request section 41b in the application server 41 receives the result of reading from each of the file servers 100, 200, and 300 and terminates the process.

Figure 20:
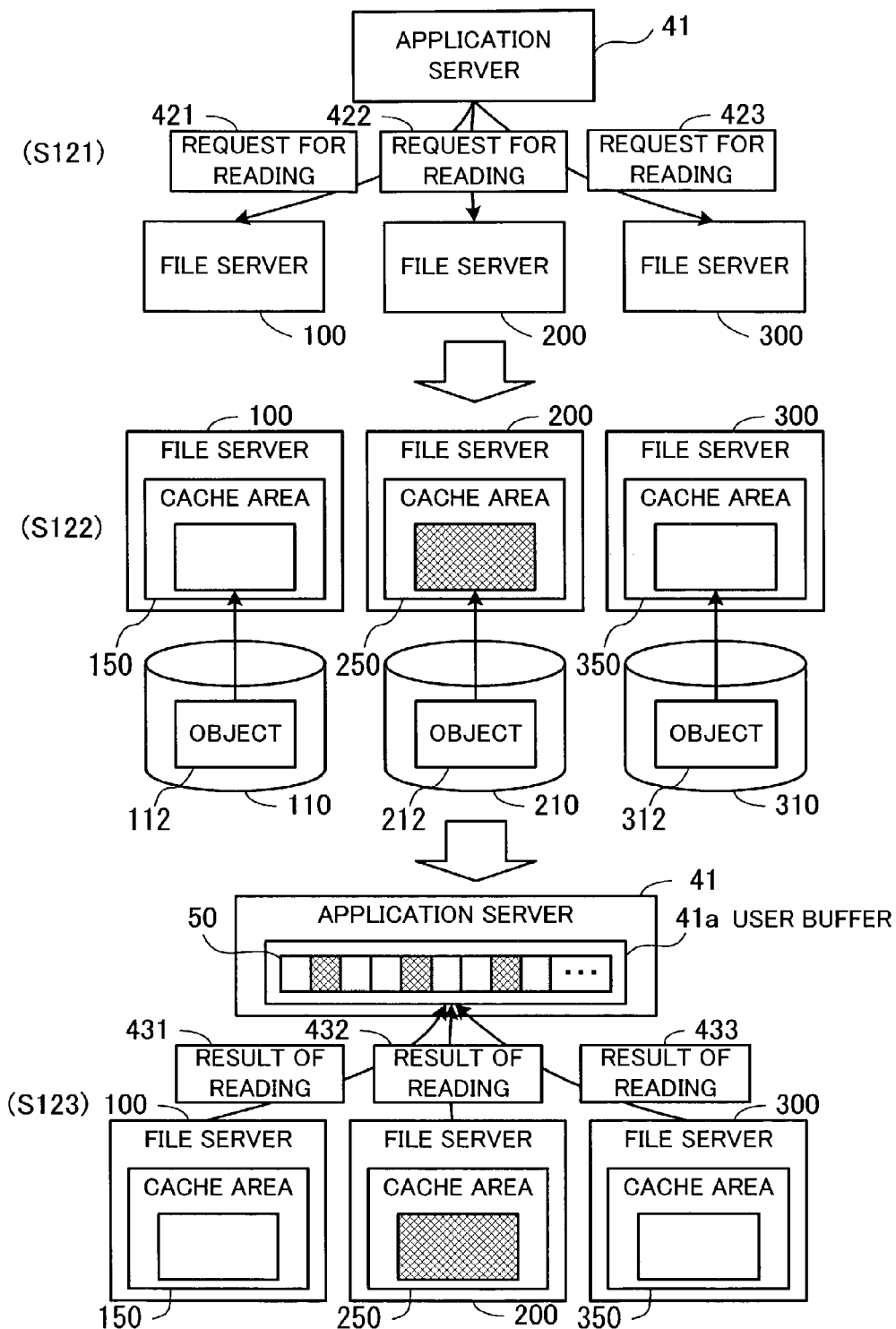
FIG. 20 is a schematic view of a reading process.

FIG. 20 is a schematic view of a reading process.

[Step S121] Requests 421 through 423 for reading are sent from the application server 41 to the file servers 100, 200, and 300 respectively. The contents of the requests 421 through 423 for reading are the same and they differ only in destination.

[Step S122] The file server 100 reads file data it has of file data specified by the request 421 for reading from the storage device 110 and stores the file data it read in the cache area 150. Similarly, the file server 200 reads file data it has of file data specified by the request 422 for reading from the storage device 210 and stores the file data it read in the cache area 250. The file server 300 reads file data it has of file data specified by the request 423 for reading from the storage device 310 and stores the file data it read in the cache area 350.

[Step S123] The file server 100 performs the RDMA transfer of a result of reading 431 including the file data stored in the cache area 150 to the user buffer 41a in the application server 41. Similarly, the file server 200 performs the RDMA transfer of a result of reading 432 including the file data stored in the cache area 250 to the user buffer 41a in the application server 41. The file server 300 performs the RDMA transfer of a result of reading 433 including the file data stored in the cache area 350 to the user buffer 41a in the application server 41. When these RDMA transfers are performed, areas where these pieces of file data are stored are specified. As a result, when the plurality of pieces of file data are stored in the user buffer 41a, they are concatenated to create the original file 50.

A file distributively stored can be read in this way.

As described above, in the embodiment of the present invention, when the application servers 41 through 43 make requests to the file servers 100, 200, and 300 for manipulating a file (such as creating a directory, writing data, or reading data), the application servers 41 through 43 send all the file servers 100, 200, and 300 requests with the same contents and make them manipulate the file. This will make it unnecessary for the application servers 41 through 43 to recognize a file server to which they should send a request for manipulating a file. That is to say, a processing function for distributing the loads on the file servers 100, 200, and 300 does not need to be implemented on computers (the application servers 41 through 43, for example) which function as the clients of the file servers 100, 200, and 300. This reduces the processing loads on computers which function as the clients of the file servers 100, 200, and 300.

Moreover, one file is stored distributively. Therefore, even if a file which contains a large amount of data is input or output, the load will not be concentrated on one file server. Furthermore, by distributively storing a file, the speed with which the process of writing or reading one file is performed will be improved. As a result, merits obtained from the improvement of communication speeds on networks can be made full use of.

Second Embodiment

In the first embodiment, the system which can perform RDMA transfer has been described. However, even if RDMA transfer cannot be performed, a file can also be stored distributively. Now, a case where RDMA transfer is not used will be described as a second embodiment.

System structure in the second embodiment is the same as that in the first embodiment shown in FIG. 2. However, the first and second embodiments differ partially in the functions of application servers and file servers. Moreover, application servers and file servers in the second embodiment can be realized by the same hardware structure that is shown in FIG. 3.

Figure 21:
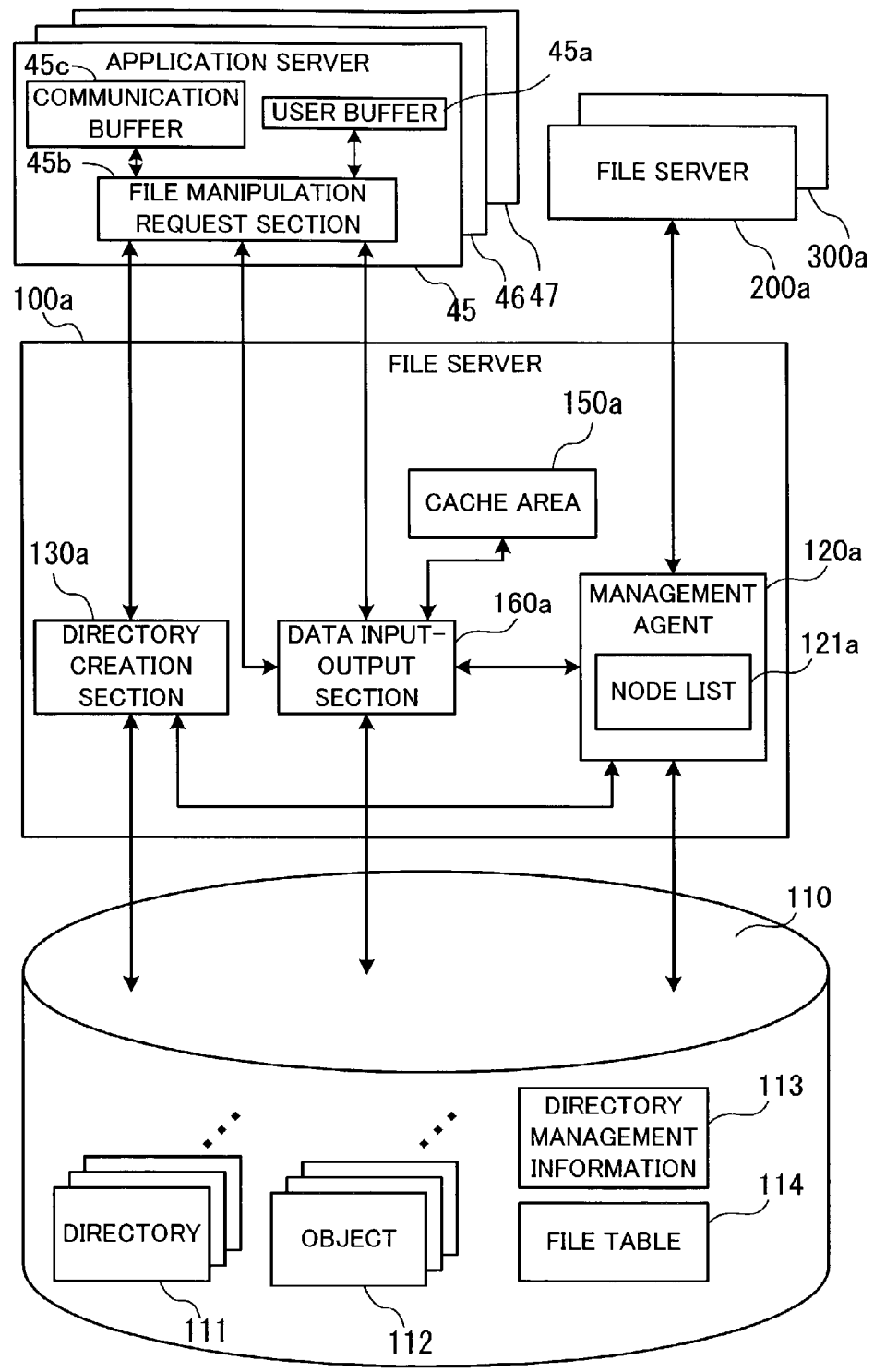
FIG. 21 is a functional block diagram of a second embodiment.

FIG. 21 is a functional block diagram of the second embodiment. The second embodiment comprises a plurality of application servers 45 through 47 and a plurality of file servers 10a, 200a, and 300a. The file servers 10a, 200a, and 300a form a cluster. Now, only the functions of the application server 45 and file server 100a will be described. The contents of a storage device 110 are the same as those in the first embodiment. Therefore, the same symbols that are shown in FIG. 4 are used and descriptions of them will be omitted.

The application server 45 includes a user buffer 45a, a file manipulation request section 45b, and a communication buffer 45c.

The user buffer 45a is a storage area used by a process for performing a process in compliance with a request from a Web server 30.

The file manipulation request section 45b sends a request for manipulating a file, such as a request for creating a directory, a request for writing a file, or a request for reading a file, to each of the file servers 100a, 200a, and 300a. If the file manipulation request section 45b sent a request for reading a file to each of the file servers 100a, 200a, and 300a, the file manipulation request section 45b will receive an object from each of the file servers 100a, 200a, and 300a as an answer to the request. Then the file manipulation request section 45b creates a file by combining the plurality of objects it received and stores the file in the user buffer 45a.

The communication buffer 45c is a storage area for storing data used when the file manipulation request section 45b communicates via a network.

The file server 100a includes a management agent 120a, a directory creation section 130a, a cache area 150a, and a data input-output section 160a. The management agent 120a holds a node list 121a. The management agent 120a and directory creation section 130a function the same as the management agent 120 and directory creation section 130, respectively, in the first embodiment shown in FIG. 4.

The cache area 150a is a storage area for temporarily storing data which the data input-output section 160a inputs to or outputs from the storage device 110.

The data input-output section 160a manipulates a file in the storage device 110 in response to a request from the application server 45 for writing or reading a file.

When the data input-output section 160a receives a request from the application server 45 for writing a file, the data input-output section 160a refers to the node list 121a held by the management agent 120a and specifies file data to be written. Then the data input-output section 160a receives the file data to be written from the file manipulation request section 45b in the application server 45 and stores it temporarily in the cache area 150a. And then the data input-output section 160a stores the file data it stored in the cache area 150a in the storage device 110 as one object 112.

When the data input-output section 160a receives a request from the application server 45 for reading a file, the data input-output section 160a reads the object 112 which forms a part of the specified file from the storage device 110 and stores it in the cache area 150a. Then the data input-output section 160a passes the object 112 stored in the cache area 150a to the file manipulation request section 45b in the application server 45.

Now, the process in the second embodiment of reading a file will be described in detail.

Figure 22:
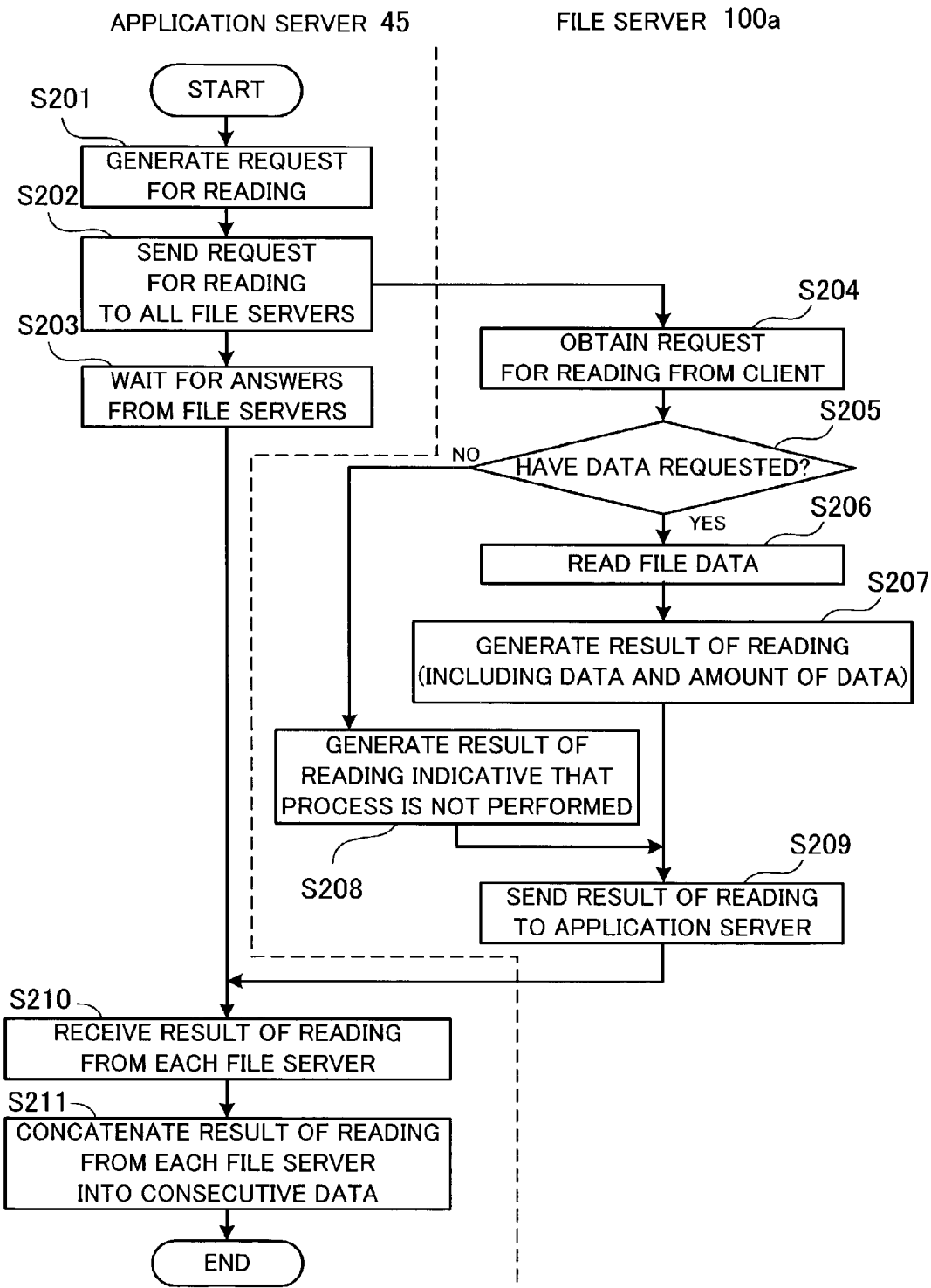
FIG. 22 is a flow chart showing the procedure of the process in the second embodiment of reading a file.

FIG. 22 is a flow chart showing the procedure of the process in the second embodiment of reading a file. Processing procedures to be followed by the application server 45 and file server 100a are shown in FIG. 22. The processing procedure to be followed by the application server 45 is shown on the left side of FIG. 22 and the processing procedure to be followed by the file server 100a is shown on the right side of FIG. 22. Now, the process shown in FIG. 22 will be described in order of step number.

[Step S201] The file manipulation request section 45b in the application server 45 generates a request for reading. The file manipulation request section 45b can make a request to read data which forms a part of a file. In this case, data to be read will be specified by an offset (the differential between the head of the file and a position where the data begins) and the length of the data.

[Step S202] The file manipulation request section 45b sends the request for reading a file to all the file servers 100a, 200a, and 300a. Then the application server 45 proceeds to step S203 and the file server 100a performs step S204.

[Step S203] The file manipulation request section 45b waits for answers from all the file servers 100a, 200a, and 300a. Then the application server 45 proceeds to step S210.

[Step S204] The data input-output section 160a in the file server 100a obtains the request for reading from the application server 45.

[Step S205] The data input-output section 160a judges whether the file server 100a has data requested as an object of reading. If the file server 100a has the data to be read, then step S206 will be performed. If the file server 100a does not have the data to be read, then step S208 will be performed.

[Step S206] The data input-output section 160a reads the file data requested from an object stored in the storage device 110 and writes it into the cache area 150a.

[Step S207] The data input-output section 160a generates the result of reading including the data requested and the amount of the data requested. Then step S209 will be performed.

[Step S208] The data input-output section 160a generates the result of reading indicative that the process is not performed.

[Step S209] The data input-output section 160a sends the result of reading to the application server 45. Then the process on the file server 100a terminates and the application server 45 performs step S210.

[Step S210] The file manipulation request section 45b in the application server 45 receives the result of reading from each of the file servers 100a, 200a, and 300a. The results of reading the file manipulation request section 45b received are stored temporarily in the communication buffer 45c.

[Step S211] The file manipulation request section 45b reads the file data included in the result of reading from each of the file servers 100a, 200a, and 300a from the communication buffer 45c and concatenates it into consecutive data. As a result, the file to be read will be created. The file manipulation request section 45b stores the file it created in the user buffer 45a.

Figure 23:
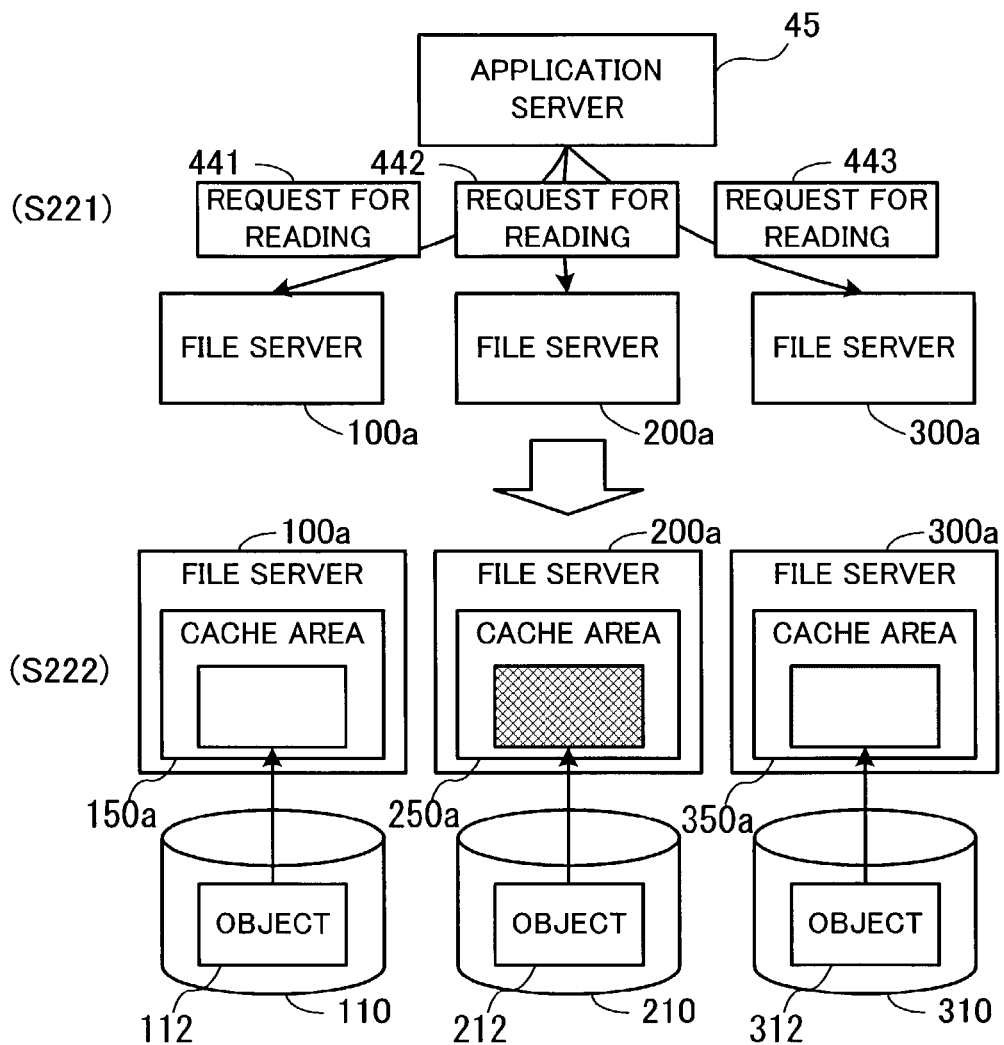
FIG. 23 is a schematic view showing the first half of the process in the second embodiment of reading a file.

FIG. 23 is a schematic view showing the first half of the process in the second embodiment of reading a file.

[Step S221] Requests 441 through 443 for reading are sent from the application server 45 to the file servers 100a, 200a, and 300a respectively. The contents of the requests 441 through 443 for reading are the same and they differ only in destination.

[Step S222] The file server 100a reads file data it has of file data specified by the request 441 for reading from the storage device 110 and stores the file data it read in the cache area 150a. Similarly, the file server 200a reads file data it has of file data specified by the request 442 for reading from the storage device 210 and stores the file data it read in the cache area 250a. The file server 300a reads file data it has of file data specified by the request 443 for reading from the storage device 310 and stores the file data it read in the cache area 350a.

Figure 24:
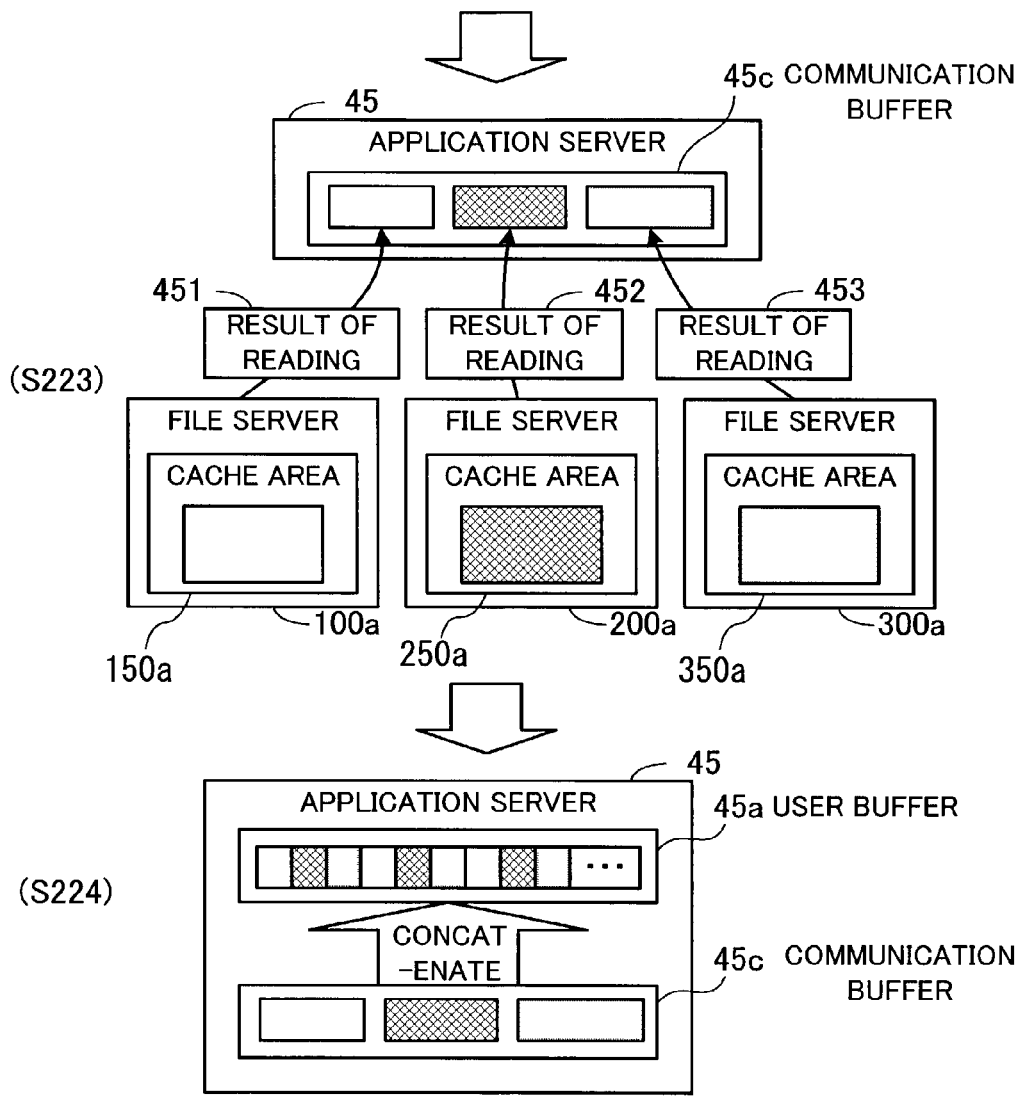
FIG. 24 is a schematic view showing the second half of the process in the second embodiment of reading a file.

FIG. 24 is a schematic view showing the second half of the process in the second embodiment of reading a file.

[Step S223] The file server 10a transfers a result of reading 451 including the file data stored in the cache area 150a to the application server 45. Similarly, the file server 200a transfers a result of reading 452 including the file data stored in the cache area 250a to the application server 45. The file server 300a transfers a result of reading 453 including the file data stored in the cache area 350a to the application server 45. The results of reading 451 through 453 are stored in the communication buffer 45c.

[Step S224] The application server 45 concatenates in the original order the file data included in the results of reading stored in the communication buffer 45c to create a file. Then the application server 45 stores the file in the user buffer 45a.

As described above, a file distributively stored can be read without using an RDMA function.

[Modifications]

Now, modifications of the above first and second embodiments will be described.

In the above embodiments, a file is stored distributively. However, there is no need to always store a file distributively. For example, a file which holds a small amount of data may be managed by one file server instead of being stored distributively. In this case, when a request to write a file is made, each file server will judge whether it should store the file. For example, a rule for determining a file to be stored which file servers must comply with is defined in advance. Each file server specifies a file it should store in compliance with the defined rule and writes the file it specified.

A rule being the same as one for, for example, determining a file server which creates a directory in response to a request to create a directory can be applied as a rule for determining a file to be stored. That is to say, a file server which created a file the last time under a directory (parent directory) under which a file is to be created is found. Then a file server which appears on a node list just after the file server which created a file the last time writes the file.

In the above first and second embodiments, descriptions of a method for determining a file server which manages file information for a file are not given. A file server which should manage file information for a file can be determined by a method being the same as the rule for determining a file to be stored shown in the above modifications.

The above processing functions can be realized with server computers and client computers. In that case, a server program in which the contents of the functions a file server should have are described and a client program in which the contents of the functions an application server should have are described are provided. By executing this server program on a server computer, the functions of a file server are realized on the server computer. Moreover, by executing this client program on a client computer, the functions of an application server are realized on the client computer.

Each of the server program and client program can be recorded on a computer readable record medium. A computer readable record medium can be a magnetic recording device, an optical disk, a magneto-optical recording medium, a semiconductor memory, or the like. A magnetic recording device can be a hard disk drive (HDD), a flexible disk (FD), a magnetic tape, or the like. An optical disk can be a digital versatile disc (DVD), a digital versatile disc random access memory (DVD-RAM), a compact disc read only memory (CD-ROM), a compact disc recordable (CD-R)/rewritable (CD-RW), or the like. A magneto-optical recording medium can be a magneto-optical disc (MO) or the like.

To place the server program or the client program on the market, portable record media, such as DVDs or CD-ROMs, on which it is recorded are sold. Alternatively, the client program is stored in advance on a hard disk in a server computer and is transferred to a client computer via a network.

When a server computer executes this server program, it will store the server program, which is recorded on a portable record medium, on, for example, its hard disk. Then it reads the server program from its hard disk and performs processes in compliance with the server program. A server computer can also read the server program directly from a portable record medium and perform processes in compliance with the server program.

When a client computer executes this client program, it will store the client program, which is recorded on a portable record medium or which is transferred from a server computer, on, for example, its hard disk. Then it reads the client program from its hard disk and performs processes in compliance with the client program. A client computer can also read the client program directly from a portable record medium and perform processes in compliance with the client program. Furthermore, each time the client program is transferred from a server computer, a client computer can perform processes in turn in compliance with the client program it received.

As has been described in the foregoing, in the present invention requests to manipulate a file are output to all the file servers and a file server which judges that it must perform a process performs a process in compliance with the request to manipulate a file. Therefore, there is no need to make a client recognize where requests to manipulate a file are sent. As a result, the efficiency of a process can be increased and great inequalities of processing loads caused by a process for making a client recognize where requests to manipulate a file are sent can be prevented.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable storage medium having a file server program for a plurality of file servers included in a cluster, the program making every file server perform operations comprising:

judging whether to perform a process in compliance with a file manipulation request sent to all the plurality of file servers included in the cluster on the basis of judgment conditions predefined for judging which process of processes performed by the cluster the file server should take charge of at the time of receiving the file manipulation request; and performing a process on a storage device which the file server manages in compliance with the file manipulation request in the case of judging that the file server must perform a process in compliance with the file manipulation request;

wherein the order in which the plurality of file servers included in the cluster take charge of processes is predefined;

the file server's turn in the order in which the plurality of file servers included in the cluster take charge of processes is defined in the judgment conditions;

in response to the file manipulation request being a request to create a directory, the order in which file servers create child directories under a common parent directory is defined by the order in which the plurality of file servers included in the cluster take charge of processes; and in response to a child directory being created, identification information for a file server which created the child directory last under the parent directory is stored, and the other file servers are informed of the identification information of the file server which created the child directory last under the parent directory.

2. The computer-readable storage medium having the file server program according to claim 1, wherein:

a process corresponding to the file manipulation request including a portion assigned as a process in the file server's charge is defined as the judgment conditions; and when a process is performed in compliance with the file manipulation request, the file server performs only the portion assigned as a process in the file server's charge.

3. The computer-readable storage medium having the file server program according to claim 1, wherein:

if the file manipulation request is a request to write a file, a rule for selecting data to be written by the file server from file data obtained by dividing the file is defined as the judgment conditions; and when a process is performed in compliance with the file manipulation request, the file server stores the data to be written by the file server in a storage device which the file server manages.

4. The computer-readable storage medium having the file server program according to claim 1, wherein:
  if the file manipulation request is a request to read a file, the file being stored in a storage device managed by the file server is defined as the judgment conditions; and
  when a process is performed in compliance with the file manipulation request, the file server reads the file from the storage device and sends the file to a unit which outputs the file manipulation request.

5. The computer-readable storage medium having the file server program according to claim 1, wherein:
  if the file manipulation request is a request to read file data which forms part of a file, the file data being stored in a storage device managed by the file server is defined as the judgment conditions; and
  when a process is performed in compliance with the file manipulation request, the file server reads the file data from the storage device and sends the file data to a unit which outputs the file manipulation request.

6. A method for manipulating a file by a computer which functions as one of a plurality of file servers included in a cluster, the method comprising:
  judging whether to perform a process in compliance with a file manipulation request sent to all the plurality of file servers on the basis of judgment conditions predefined for judging which process of processes performed by the cluster the computer should take charge of at the time of receiving the file manipulation request; and
  performing a process on a storage device under the management of the computer in compliance with the file manipulation request in the case of judging that the computer must perform a process in compliance with the file manipulation request;
  wherein the order in which the plurality of file servers included in the cluster take charge of processes is predefined;
  the computer's turn in the order in which the plurality of file servers included in the cluster take charge of processes is defined in the judgment conditions;
  in response to the file manipulation request being a request to create a directory, the order in which file servers create child directories under a common parent directory is defined by the order in which the plurality of file servers included in the cluster take charge of processes; and
  in response to a child directory being created, identification information for a file server which created the child directory last under the parent directory is stored, and the other file servers are informed of the identification information of the file server which created the child directory last under the parent directory.

7. A file server which functions as one of a plurality of units included in a cluster, the server comprising:
  a storage device;
  a judgment section for judging whether to perform a process in compliance with a file manipulation request sent to all the plurality of units included in the cluster on the basis of judgment conditions predefined for judging which process of processes performed by the cluster the file server should take charge of at the time of receiving the file manipulation request; and
  a process performance section for performing a process on the storage device in compliance with the file manipulation request in the case of the judgment section judging that the file server must perform a process in compliance with the request file manipulation;
  wherein the order in which the plurality of file servers included in the cluster take charge of processes is predefined;
  the computer's turn in the order in which the plurality of file servers included in the cluster take charge of processes is defined in the judgment conditions;
  in response to the file manipulation request being a request to create a directory, the order in which file servers create child directories under a common parent directory is defined by the order in which the plurality of file servers included in the cluster take charge of processes; and
  in response to a child directory being created, identification information for a file server which created the child directory last under the parent directory is stored, and the other file servers are informed of the identification information of the file server which created the child directory last under the parent directory.

* * * * *